(12) United States Patent
Fink

(10) Patent No.: US 10,040,417 B2
(45) Date of Patent: Aug. 7, 2018

(54) SIDE CURTAIN AIRBAG AND METHOD AND APPARATUS FOR MANUFACTURING A SIDE CURTAIN AIRBAG

(75) Inventor: Michael F. Fink, Mesa, AZ (US)

(73) Assignee: NXGEN TECHNOLOGIES LLC, Mesa, AZ (US)

( * ) Notice: Subject to any disclaimer, the term of this patent is extended or adjusted under 35 U.S.C. 154(b) by 0 days.

(21) Appl. No.: 14/115,587

(22) PCT Filed: May 2, 2012

(86) PCT No.: PCT/US2012/036095
§ 371 (c)(1),
(2), (4) Date: Jan. 20, 2014

(87) PCT Pub. No.: WO2012/151261
PCT Pub. Date: Nov. 8, 2012

(65) Prior Publication Data
US 2014/0125040 A1    May 8, 2014

Related U.S. Application Data

(60) Provisional application No. 61/481,549, filed on May 2, 2011.

(51) Int. Cl.
*B60R 21/235* (2006.01)
*B60R 21/231* (2011.01)
(Continued)

(52) U.S. Cl.
CPC .......... *B60R 21/235* (2013.01); *B60R 21/231* (2013.01); *B60R 21/232* (2013.01);
(Continued)

(58) Field of Classification Search
CPC ........ D05B 13/00; D05B 27/04; D05B 23/00; D05B 35/02; B60R 21/23138;
(Continued)

(56) References Cited

U.S. PATENT DOCUMENTS 3,762,351 A * 10/1973 Jager ........................ 112/475.08
3,855,955 A    12/1974 Strang
(Continued)

FOREIGN PATENT DOCUMENTS

CN    101389510 A    3/2009
CN    101786442 A    7/2010
(Continued)

OTHER PUBLICATIONS

Written Opinion for International Application No. PCT/US2012/036095; dated Nov. 29, 2012.
(Continued)

*Primary Examiner* — Laura Freedman
(74) *Attorney, Agent, or Firm* — Cantor Colburn LLP

(57) ABSTRACT

An inflatable cushion for a side of a vehicle is provided, the inflatable cushion having a first portion of material; a second portion of material, the first portion of material being secured to the second portion of material to define the inflatable cushion; wherein at least a portion of a peripheral edge of the inflatable cushion is defined by a seam wherein an inner surface of the first portion is secured to an inner surface of the second portion only by a plurality of stitches; and wherein a strip of a third portion of material is applied to the seam of an outer surface of either the first portion or the second portion when the plurality of stitches are applied.

18 Claims, 11 Drawing Sheets

(51) Int. Cl.
- *B60R 21/232* (2011.01)
- *B60R 21/2338* (2011.01)
- *D05B 35/02* (2006.01)
- *D05B 27/04* (2006.01)
- *D05B 13/00* (2006.01)
- *D05B 23/00* (2006.01)
- *B60R 21/233* (2006.01)

(52) U.S. Cl.
CPC .... *B60R 21/2338* (2013.01); *B60R 21/23138* (2013.01); *D05B 13/00* (2013.01); *D05B 23/00* (2013.01); *D05B 27/04* (2013.01); *D05B 35/02* (2013.01); *B60R 2021/23316* (2013.01); *B60R 2021/23386* (2013.01); *B60R 2021/23509* (2013.01); *B60R 2021/23514* (2013.01); *B60R 2021/23538* (2013.01); *B60R 2021/23561* (2013.01); *B60R 2021/23576* (2013.01)

(58) Field of Classification Search
CPC ........ B60R 21/232; B60R 2021/23576; B60R 2021/23538; B60R 2021/23514; B60R 2021/23561
USPC ............................................................ 280/730.2
See application file for complete search history.

(56) References Cited

U.S. PATENT DOCUMENTS

| | | | |
|---|---|---|---|
| 4,530,568 A | 7/1985 | Haduch et al. | |
| 5,114,180 A | 5/1992 | Kami | |
| 5,141,787 A * | 8/1992 | Yamamoto | 428/35.5 |
| 5,348,342 A | 9/1994 | Haland et al. | |
| 5,378,019 A | 1/1995 | Smith et al. | |
| 5,421,610 A | 6/1995 | Kavanaugh et al. | |
| 5,630,620 A * | 5/1997 | Hirai et al. | 280/743.1 |
| 5,788,270 A | 8/1998 | Haland et al. | |
| 5,797,621 A * | 8/1998 | Ono | 280/730.2 |
| 5,992,881 A | 11/1999 | Faigle | |
| 6,010,149 A | 1/2000 | Riedel et al. | |
| 6,037,279 A | 3/2000 | Brookman et al. | |
| 6,073,961 A | 6/2000 | Bailey et al. | |
| 6,099,029 A | 8/2000 | Haland et al. | |
| 6,135,493 A | 10/2000 | Jost et al. | |
| 6,152,481 A | 11/2000 | Webber et al. | |
| 6,164,688 A | 12/2000 | Einsiedel et al. | |
| 6,170,860 B1 | 1/2001 | Denz et al. | |
| 6,177,365 B1 | 1/2001 | Li | |
| 6,199,898 B1 * | 3/2001 | Masuda | B60R 21/232 |
| | | | 280/729 |
| 6,220,629 B1 * | 4/2001 | Wipasuramonton et al. | 280/743.1 |
| 6,237,937 B1 | 5/2001 | Kokeguchi et al. | |
| 6,293,581 B1 | 9/2001 | Saita et al. | |
| 6,312,009 B1 | 11/2001 | Haland et al. | |
| 6,325,409 B1 | 12/2001 | Fischer | |
| 6,334,625 B1 | 1/2002 | Pausch et al. | |
| 6,378,895 B1 | 4/2002 | Brucker et al. | |
| 6,394,487 B1 | 5/2002 | Heudorfer et al. | |
| 6,402,190 B1 | 6/2002 | Heudorfer et al. | |
| 6,402,192 B2 | 6/2002 | Haland et al. | |
| 6,409,211 B1 | 6/2002 | Sheng et al. | |
| 6,431,589 B1 | 8/2002 | Heigl et al. | |
| 6,435,553 B1 * | 8/2002 | Wipasuramonton et al. | 280/743.1 |
| 6,450,529 B1 | 9/2002 | Kalandek et al. | |
| 6,457,742 B1 | 10/2002 | Brucker | |
| 6,467,802 B2 | 10/2002 | Heigl | |
| 6,481,743 B1 | 11/2002 | Tobe et al. | |
| 6,494,480 B2 | 12/2002 | Haland et al. | |
| 6,502,857 B2 | 1/2003 | Nakanishi et al. | |
| 6,520,539 B1 * | 2/2003 | Ritter | 280/743.1 |
| 6,530,595 B2 | 3/2003 | Masuda et al. | |
| 6,543,806 B1 | 4/2003 | Fink | |
| 6,554,314 B1 | 4/2003 | Uchiyama et al. | |
| 6,554,315 B2 | 4/2003 | Freesmeier | |
| 6,595,546 B2 | 7/2003 | Smith | |
| 6,612,612 B2 | 9/2003 | Zerbe | |
| 6,616,179 B2 | 9/2003 | Tanase et al. | |
| 6,623,031 B2 | 9/2003 | Haland et al. | |
| 6,666,475 B2 | 12/2003 | Kippschull | |
| 6,672,617 B1 | 1/2004 | Gilpatrick et al. | |
| 6,715,786 B1 | 4/2004 | Willibey | |
| 6,726,243 B2 | 4/2004 | Dinsdale et al. | |
| 6,734,123 B2 | 5/2004 | Veiga et al. | |
| 6,742,805 B2 * | 6/2004 | Hill | 280/730.2 |
| 6,749,220 B1 * | 6/2004 | Wipasuramonton et al. | 280/743.1 |
| 6,755,436 B2 | 6/2004 | Hess et al. | |
| 6,779,562 B2 | 8/2004 | Tietze | |
| 6,860,507 B2 | 3/2005 | Uchiyama et al. | |
| 6,883,826 B2 | 4/2005 | Fujiwara | |
| 6,913,282 B2 | 7/2005 | Takahashi | |
| 6,945,556 B2 | 9/2005 | Maertens | |
| 6,962,364 B2 | 11/2005 | Ju et al. | |
| 7,032,622 B2 | 4/2006 | Kitamura et al. | |
| 7,168,735 B2 * | 1/2007 | Kino et al. | 280/730.2 |
| 7,264,269 B2 * | 9/2007 | Gu et al. | 280/730.2 |
| 7,316,415 B2 * | 1/2008 | Jamison | 280/729 |
| 7,404,572 B2 | 7/2008 | Salmo et al. | |
| 7,418,909 B2 * | 9/2008 | Kobayashi | 112/235 |
| 7,431,332 B2 | 10/2008 | Wipasuramonton et al. | |
| 7,458,606 B2 | 12/2008 | Charpentier | |
| 7,648,162 B2 | 1/2010 | Brough et al. | |
| 7,654,567 B2 | 2/2010 | Taylor et al. | |
| 7,762,575 B2 | 7/2010 | Jang et al. | |
| 7,784,822 B2 * | 8/2010 | Fink | 280/730.2 |
| 7,784,823 B2 | 8/2010 | Heigl et al. | |
| 7,828,322 B2 * | 11/2010 | Breuninger et al. | 280/730.2 |
| 7,971,899 B2 * | 7/2011 | Abney et al. | 280/730.2 |
| 8,007,002 B2 | 8/2011 | Kalandek et al. | |
| 8,282,125 B2 * | 10/2012 | Pinsenschaum et al. | 280/730.2 |
| 8,573,637 B2 * | 11/2013 | Fink | 280/730.2 |
| 8,613,465 B2 * | 12/2013 | Nozaki et al. | 280/730.2 |
| 8,740,247 B1 * | 6/2014 | Jovicevic | 280/743.1 |
| 8,851,507 B1 * | 10/2014 | Kemp et al. | 280/728.2 |
| 9,862,348 B2 * | 1/2018 | Fink | B60R 21/232 |
| 2001/0026062 A1 | 10/2001 | Kosugi et al. | |
| 2002/0024203 A1 | 2/2002 | Takahashi | |
| 2002/0050117 A1 | 5/2002 | Dasher et al. | |
| 2002/0101066 A1 | 8/2002 | Tanase et al. | |
| 2002/0105174 A1 | 8/2002 | Tanase et al. | |
| 2002/0149180 A1 | 10/2002 | Keshavaraj | |
| 2002/0195804 A1 | 12/2002 | Hess et al. | |
| 2003/0085559 A1 | 5/2003 | Nakayasu et al. | |
| 2003/0124929 A1 | 7/2003 | Hurst et al. | |
| 2003/0178829 A1 | 9/2003 | Dinsdale et al. | |
| 2003/0230876 A1 | 12/2003 | Ohrvall et al. | |
| 2003/0230877 A1 | 12/2003 | Kim et al. | |
| 2003/0234522 A1 | 12/2003 | Thomas | |
| 2004/0104561 A1 | 6/2004 | Maertens | |
| 2004/0108694 A1 | 6/2004 | Takahashi | |
| 2004/0239082 A1 | 12/2004 | Schneider et al. | |
| 2004/0242098 A1 | 12/2004 | Bass | |
| 2005/0035580 A1 | 2/2005 | Inman et al. | |
| 2005/0062272 A1 | 3/2005 | Smith et al. | |
| 2005/0146118 A1 | 7/2005 | Kitamura et al. | |
| 2006/0001244 A1 | 1/2006 | Taguchi et al. | |
| 2006/0017267 A1 | 1/2006 | Fink | |
| 2006/0033314 A1 | 2/2006 | Karlbauer et al. | |
| 2006/0108776 A1 | 5/2006 | Bradbum | |
| 2006/0119084 A1 | 6/2006 | Coon et al. | |
| 2006/0205302 A1 * | 9/2006 | Woydick | 442/76 |
| 2006/0261579 A1 | 11/2006 | Breed | |
| 2007/0228709 A1 | 10/2007 | Khouri | |
| 2007/0237961 A1 | 10/2007 | Li et al. | |
| 2008/0015052 A1 | 1/2008 | Endo et al. | |
| 2008/0018082 A1 | 1/2008 | Wieczorek et al. | |
| 2008/0084052 A1 | 4/2008 | Abney et al. | |
| 2008/0121156 A1 | 5/2008 | Kobayashi | |
| 2009/0127837 A1 | 5/2009 | Abney | |
| 2009/0212540 A1 | 8/2009 | Kamiyama | |

(56) References Cited

U.S. PATENT DOCUMENTS

| | | | |
|---|---|---|---|
| 2009/0297723 | A1 | 12/2009 | Ramesh et al. |
| 2011/0042924 | A1 | 2/2011 | Pinsenschaum et al. |
| 2011/0057425 | A1 | 3/2011 | Fink et al. |
| 2014/0125040 | A1 | 5/2014 | Fink |
| 2015/0354115 | A1* | 12/2015 | Fink ............... B60R 21/232 |
| | | | 112/307 |

FOREIGN PATENT DOCUMENTS

| | | | |
|---|---|---|---|
| DE | 2058833 | A1 | 5/1972 |
| EP | 0380699 | A1 | 8/1990 |
| EP | 1462321 | A1 | 9/2004 |
| FR | 2767763 | A1 | 3/1999 |
| GB | 2312877 | A | 11/1997 |
| GB | 2393692 | A | 4/2004 |
| GB | 2395170 | A | 5/2004 |
| JP | 09301104 | A | 11/1997 |
| JP | 11301394 | A | 11/1999 |
| JP | 11314555 | A | 11/1999 |
| JP | 2000296749 | | 10/2000 |
| JP | 2000296750 | | 10/2000 |
| JP | 2000296751 | | 10/2000 |
| JP | 2000296752 | | 10/2000 |
| JP | 2000296753 | | 10/2000 |
| JP | 2000296754 | | 10/2000 |
| JP | 2001328505 | A | 11/2001 |
| JP | 2002019567 | A | 1/2002 |
| JP | 2002067861 | A | 3/2002 |
| JP | 2002067863 | A | 3/2002 |
| JP | 2003072504 | | 3/2002 |
| JP | 2002316609 | A | 10/2002 |
| JP | 2003025946 | A | 1/2003 |
| JP | 2003306118 | | 10/2003 |
| JP | 2007076517 | A | 3/2007 |
| JP | 2007223373 | | 9/2007 |
| KR | 100698730 | A1 | 3/2007 |
| KR | 100736464 | B1 | 6/2007 |
| WO | 02066297 | A1 | 8/2002 |
| WO | 03057540 | A1 | 7/2003 |
| WO | 03101791 | A1 | 12/2003 |
| WO | 2005039938 | A1 | 5/2005 |
| WO | 2005061287 | A1 | 7/2005 |
| WO | 2006014977 | A2 | 2/2006 |
| WO | 2011022562 | A1 | 2/2011 |
| WO | 2011022562 | A2 | 2/2011 |

OTHER PUBLICATIONS

International Search Report for International Application No. PCT/US2012/036095; dated Nov. 29, 2012.
European Search Report No. 05 779 363.0-1523 dated Sep. 14, 2009.
International Search Report for PCT/US2010/034925 dated Jan. 18, 2011.
Translation of JP2003-025946.
Written Opinion for PCT/US2010/034925 dated Jan. 18, 2011.
Written Opinion; International Application No. PCT/US2010/038302; International Filing Date: Jun. 11, 2010; dated Feb. 8, 2011; 3 pages.
International Search Report dated May 30, 2011 for International Application No. PCT/US2010/046036.
Written Opinion dated May 30, 2011 for International Application No. PCT/US2010/046036.
International Search Report; International Application No. PCT/US2010/039157; International Filing Date: Jun. 18, 2010; dated Feb. 14, 2011; 5 pages.
Written Opinion; International Application No. PCT/US2010/039157; International Filing Date: Jun. 18, 2010; dated Feb. 14, 2011; 3 pages.
International Search Report for International Application No. PCT/US2011/022926; dated Oct. 31, 2011.
International Search Report for International Application No. PCT/US2011/022933; dated Oct. 21, 2011.
European Search Report dated Nov. 29, 2012 for Application No. PCT/US2012036095.
Written Opinion dated Nov. 29, 2012 for Application No. PCT/US2012036095.
Supplementary European Search Report dated Feb. 5, 2013.
Supplementary European Search Report dated Jan. 4, 2013.
CN Office Action for Application No. 201280033149.9; dated Jul. 3, 2015; 8 pgs.
CN Office Action for Application No. 201280033149.9; dated May 11, 2016; 9 pgs.
English Translation of CN Office Action for Application No. 201280033149.9; dated May 11, 2016; 15 pgs.
English Translation of CN Office Action for Application No. 201280033149.9: dated Jul. 3, 2015, 10 pgs.
Final Office Action dated Dec. 16, 2016.
International Search Report for International Application No. PCT/US2010/046036; International Filing Date: Aug. 19, 2010; dated May 30, 2011; 3 pages.
International Search Report for International Application No. PCT/US2011/022926; International Filing Date: Jan. 28, 2011; dated Oct. 31, 2011; 3 pgs.
International Search Report for International Application No. PCT/US2012/036095; International Filing Date: May 2, 2012; dated Nov. 29, 2012; 5 pgs.
International Search Report for International Application No. PCT/US210/039157; International Filing date: Jun. 18, 2010; dated Feb. 14, 2011; 5 pgs.
International Search Report for International Application No. PCT/US2010/034925; International Filing Date: May 14, 2010; dated Jan. 18, 2011; 3 pages.
International Search Report for International Application No. PCT/US2011/022933; International Filing Date: Jan. 28, 2011; dated Oct. 21, 2011; 3 pgs.
International Search Report; International Application No. PCT/US2010/038302; International Filing Date: Jun. 11, 2010; dated Feb. 8, 2011; 5 pages.
International Written Opinion for International Application No. PCT/US210/039157; International Filing Date: Jun. 18, 2010; dated Feb. 14, 2011; 3 pgs.
International Written Opinion for International Application No. PCT/US2012/036095; International Filing Date: May 2, 2012; dated Nov. 29, 2012; 4 pgs.
Non-Final Office Action for U.S. Appl. No. 14/070,063; filed Nov. 1, 2013; dated Sep. 25, 2014; 13 pgs.
Non-Final Office Action for U.S. Appl. No. 14/739,930; filed Jun. 15, 2015; dated Jun. 14, 2016; 18 pgs.
Written Opinion of the International Searching Authority for International Application No. PCT/US2010/034925; International Filing Date: May 14, 2010; dated Jan. 18, 2011; 4 pages.
Written Opinion of the International Searcing Authority for International Application No. PCT/US2010/046036; International Filing Date: Aug. 19, 2010; dated May 30, 2011; 4 pages.
Written Opinion; International Application No. PCT/US2010/038302; International Filing Date: Jun. 11, 2010; dated Feb. 8, 2011: 3 pages.

* cited by examiner

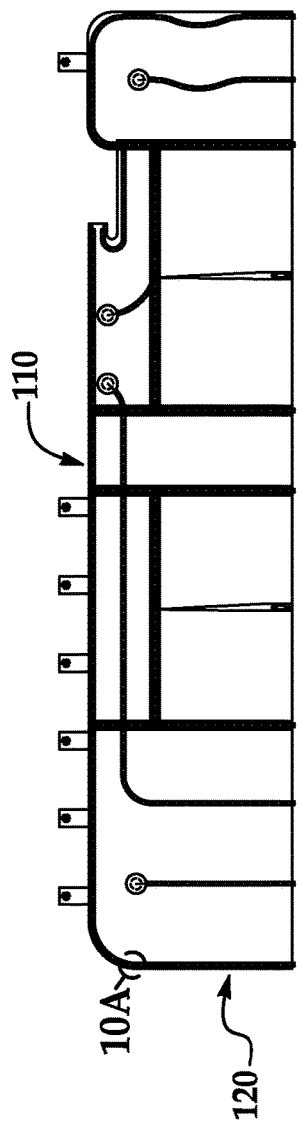
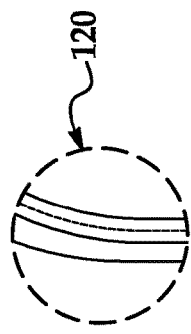
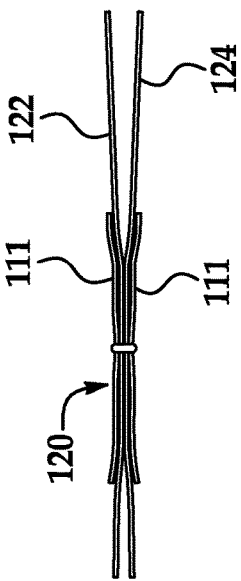
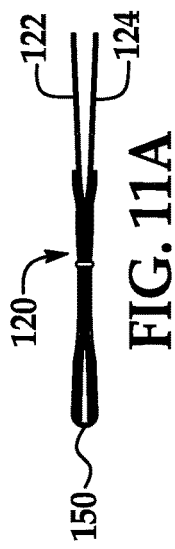
FIG. 11A
FIG. 11B
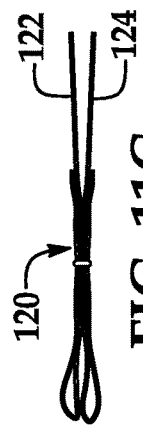
FIG. 11C
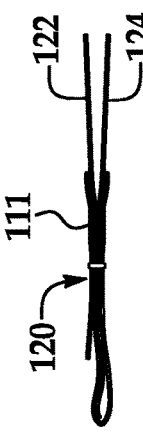
FIG. 11D
FIG. 10
FIG. 10A
FIG. 10B

US 10,040,417 B2

SIDE CURTAIN AIRBAG AND METHOD AND APPARATUS FOR MANUFACTURING A SIDE CURTAIN AIRBAG

CROSS REFERENCE TO RELATED APPLICATIONS

This application claims the benefit of U.S. Provisional Patent Application Ser. No. 61/481,549 filed May 2, 2011, the contents of which are incorporated herein by reference thereto.

BACKGROUND

Exemplary embodiments of the present invention relate generally to inflatable curtain airbags and methods for constructing the same.

Various side impact or rollover airbags (also referred to as side curtains or curtain airbags) provide a cushion between a side of a vehicle and the occupant. Side curtain airbags generally deploy downward from a stowed position within the roofline of vehicle and inflate between the occupant and the vehicle interior side structure, such as the side windows and the A, B and/or C pillars.

A side curtain airbag generally consists of two fabric layers either sewn or interwoven together to create a plurality of inflatable cells. These cells are inflated during a predetermined activation event wherein a signal is provided to inflate the side curtain airbag. A side curtain may have a plurality of cells in various arrangements and/or configurations.

In some applications, it is desirable to provide an inflatable cushion or airbag with a low leak seam and method for providing such an inflatable cushion. In other applications, it is desirable to provide an inflatable cushion tailored to provide support across an area of deployment.

SUMMARY OF THE INVENTION

Thus in accordance with exemplary embodiments of the present invention there is provided an inflatable cushion for a side of a vehicle. The inflatable cushion having a first portion of material; a second portion of material, the first portion of material being secured to the second portion of material to define the inflatable cushion; wherein at least a portion of a peripheral edge of the inflatable cushion is defined by a seam wherein an inner surface of the first portion is secured to an inner surface of the second portion only by a plurality of stitches; and wherein a strip of a third portion of material is applied to the seam of an outer surface of either the first portion or the second portion when the plurality of stitches are applied.

A method for forming a seam of an inflatable cushion, the method including the steps of: securing a first portion of material and a second portion of material to define the seam of the inflatable cushion wherein an inner surface of the first portion is secured to an inner surface of the second portion only by a plurality of stitches; and continuously feeding a strip of material into a sewing machine forming the seam such that the strip of material is secured to an outer surface of either the first portion of material or the second portion of the material of an inflatable cushion, wherein the strip of material is secured thereto only by the plurality of stitches and wherein no adhesives are used to secure the strip of material or the first portion of material or the second portion of material to each other.

An inflatable cushion for a side of a vehicle, the inflatable cushion having: at least one inflatable cell proximate to an end of an inflatable portion of the inflatable cushion, the least one inflatable cell being defined by a first layer of cushion fabric secured to a second layer of cushion fabric; a single sheet of material secured to the inflatable cushion, the single sheet of fabric defining a non-inflatable portion of the inflatable cushion and wherein a portion of the single sheet of material traverses the at least one inflatable cell and is tangent to a face of the at least one inflatable cell when it is inflated such that upon inflation of the at least one inflatable cell tension is created in the single sheet of fabric and wherein the single sheet of material passes through a slot located between the at least one inflatable cell and another inflatable cell such that the single sheet of material traverses the another inflatable cell and is tangent to a face of the another inflatable cell.

BRIEF DESCRIPTION OF THE DRAWINGS

FIGS. 10-10B illustrate a portion of the seam of an airbag constructed in accordance with one non-limiting exemplary embodiment;

FIGS. 11A-11D illustrate alternative seams of airbags constructed in accordance with various embodiments;

DETAILED DESCRIPTION OF THE PREFERRED EMBODIMENTS

Reference will now be made in detail to exemplary embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Reference is made to the following Patents, Patent Publications, and Patent Applications, U.S. patent application Ser. No. 12/813,910 filed Jun. 11, 2010, which claims the benefit of U.S. Provisional Patent Application Ser. No. 61/186,656 filed Jun. 12, 2009 and published as U.S. 20110057425; U.S. Ser. No. 11/190,499 filed Jul. 26, 2005, now U.S. Pat. No. 7,784,822; and U.S. Ser. No. 12/256,224 filed Oct. 22, 2008, and published as U.S. 20090127837, now U.S. Pat. No. 7,971,899 the contents each of which are incorporated herein by reference thereto.

Figure 1:
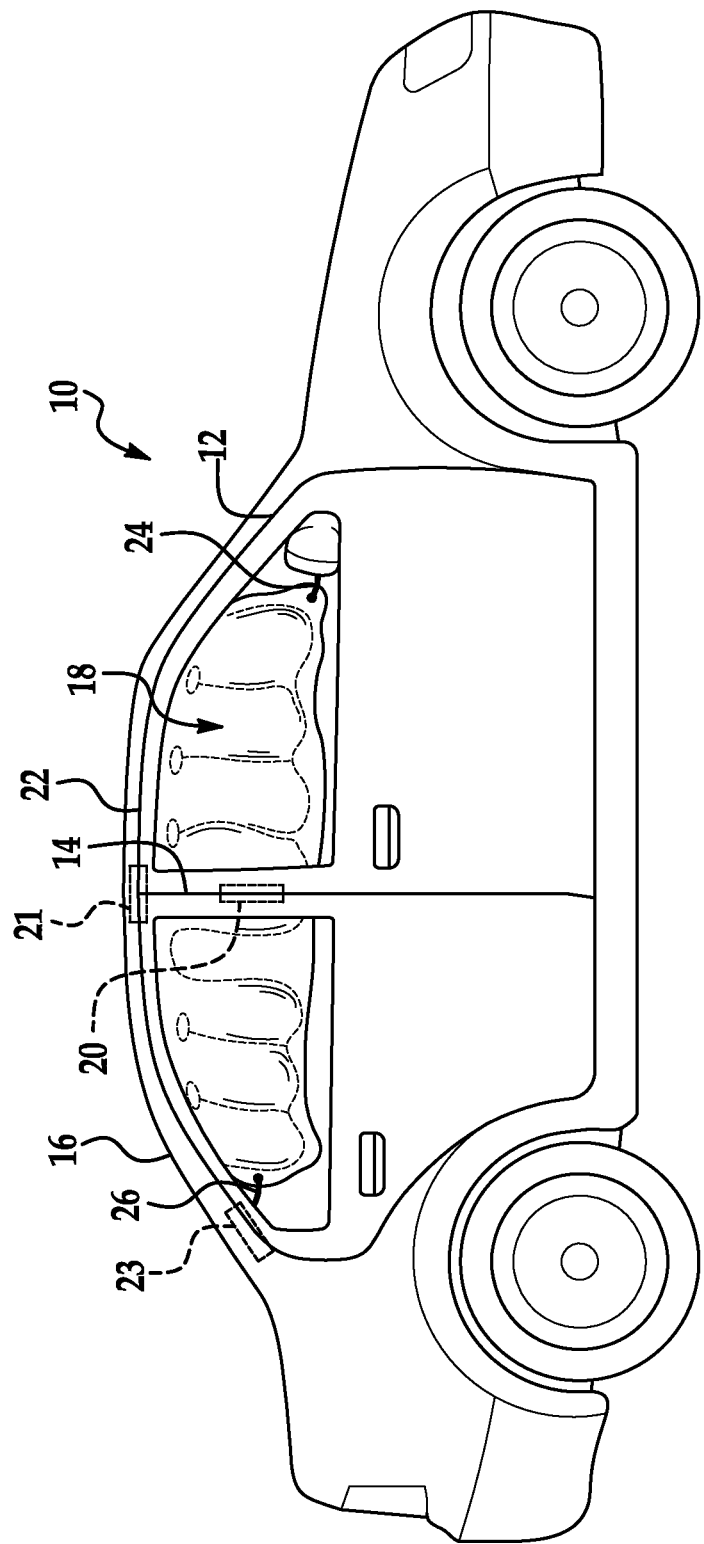
FIG. 1 is a side view of a vehicle with an inflated side curtain airbag.

Referring to the drawings, and particularly to FIG. 1, a vehicle 10 is shown. Vehicle 10 includes an A-pillar 12, a B-pillar 14, and a C-pillar 16. A non-limiting side curtain airbag 18 is illustrated and extends between A-pillar 12 and C-pillar 16. In FIG. 1, airbag 18 is shown in an inflated state. In this regard, an inflator 20 provides a gas necessary to inflate airbag 18. Inflators 20, 21 and 23 are shown in dashed lines to display alternative locations for the inflator. Thus, the inflator may be located in the B-pillar, in the C-pillar, in the roof, or in another suitable location within vehicle 10.

Before airbag 18 is deployed, it may be stored within roof rail 22 of vehicle 10. Optionally, tethers 24 and 26 may be used to restrain airbag 18. In the embodiment shown in FIG. 1, tethers 24 and 26 attach at one end to airbag 18 and at the other end to the body of the vehicle.

Figure 2:
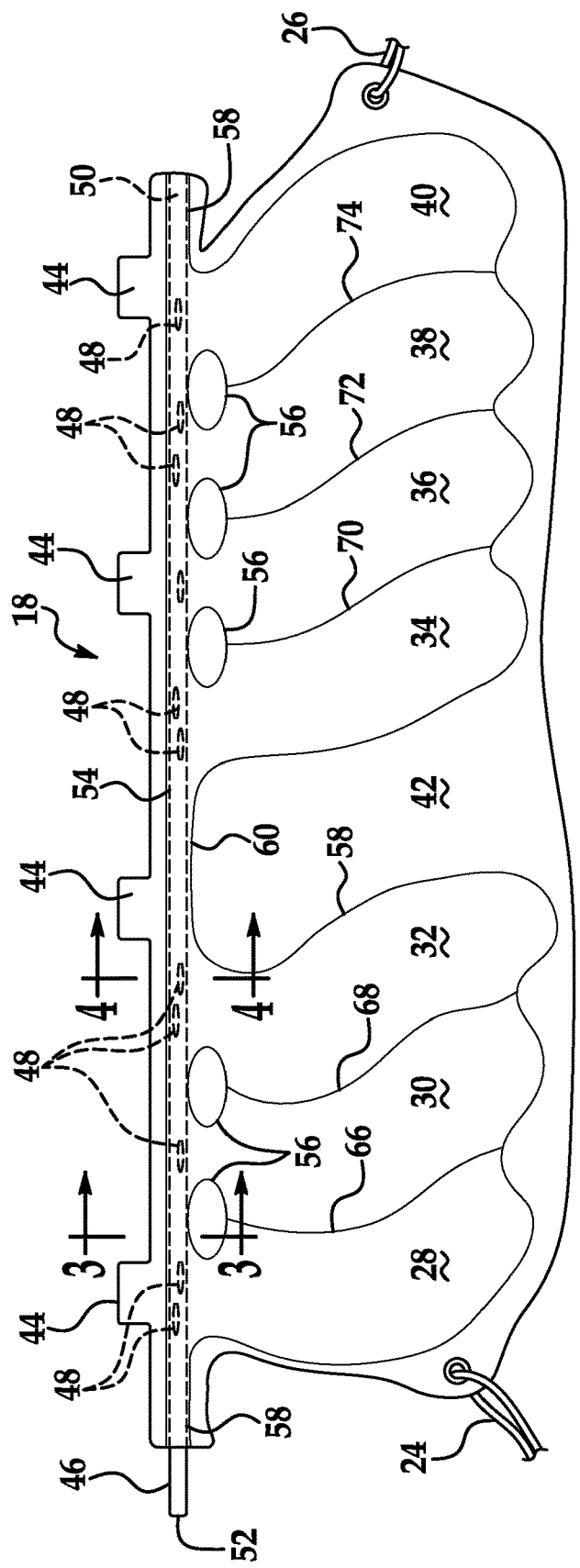
FIG. 2 is an elevational view of the airbag in FIG. 1.

Referring now to FIG. 2, further details of side curtain airbag 18 can be most easily explained. Airbag 18 includes a plurality of substantially isolated cells 28, 30, 32, 34, 36, 38, and 40. Cells 28, 30, and 32 make up a rear bank of cells between B-pillar 14 and C-pillar 16, while cells 34, 26, 38, and 40 make up a front bank of cells between A-pillar 12 and B-pillar 14. Area 42 is not inflated because an occupant is less likely to come into contact with that area. In some embodiments, however, area 42 may be a cell, or may inflate at a time later than the other cells.

Figure 2A:
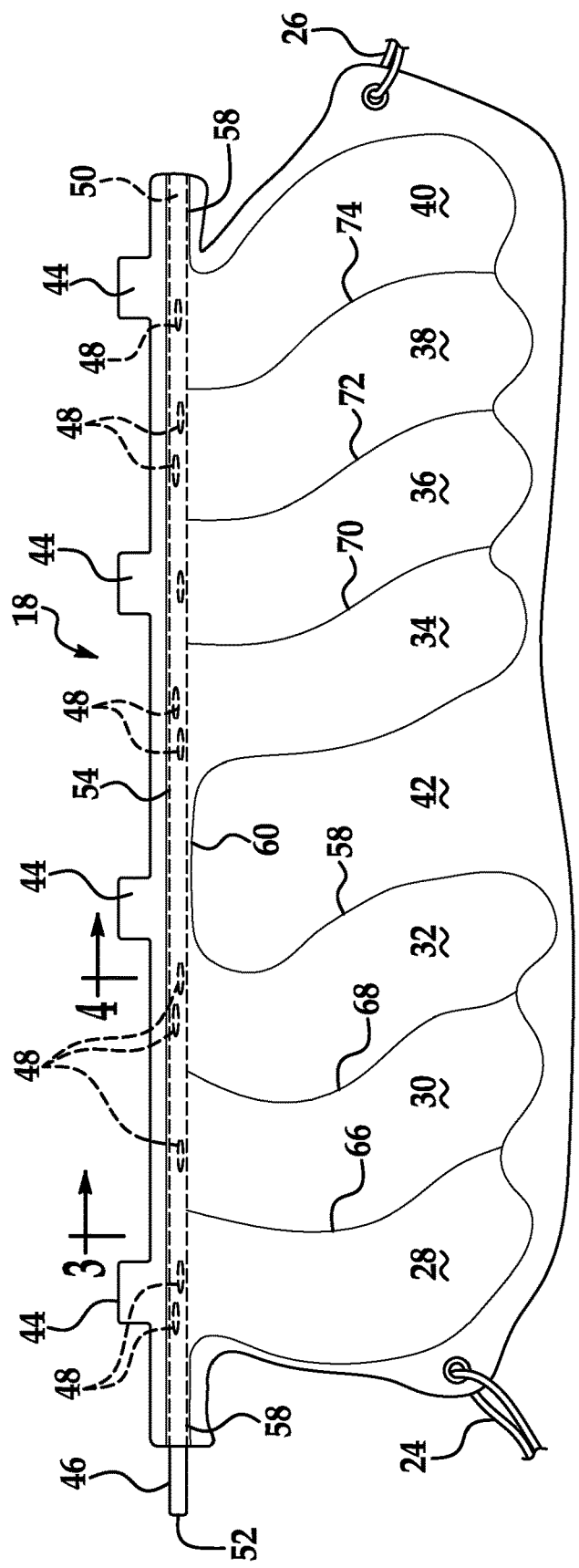
FIG. 2A is an elevational view of an alternative airbag.

Continuing to refer to FIG. 2, tabs 44 are provided in this embodiment to attach airbag 18 to roof rail 22. Instead of tabs 44, any suitable method of attachment may be used. A delivery tube 46 having a plurality of outlet orifices 48 is also provided. In the illustrated embodiment, outlet orifices 48 are formed as scoops. Orifices 48 open to cells 28, 30, 32, 34, 36, 38, and 40. To reduce turbulence within tube 46 and to better distribute the gas, outlet orifices 48 may be staggered about tube 48. Such staggering can be seen in FIG. 2. Delivery tube 46 is sealed at 50. Gas from inflator 23 enters delivery tube 46 at end 52 and is distributed into the cells through outlet orifices 48. The mating of delivery tube 46 with airbag 18 can be described. In this embodiment, tube 46 is inserted into the top portion of airbag 18. A top perimeter seam 54 runs along the top of airbag 18 and forms an upper restraint for tube 46. A series of sewn ovals 56 are formed by stitching between the cells. The tops of ovals 56 form a substantially tight fit with the bottom of tube 46. In this context, "tight" does not mean that no gas is able to flow between ovals 56 and tube 46. Instead, "tight" refers to a close-fit that may be optimized to allow some gas flow between adjacent cells. Along with continuous seam 58 and seams 66, 68, 70, 72, and 74, ovals 56 form cells 28, 30, 32, 34, 36, 38, and 40. Any of the sewn seams may be single stitched, double stitched, or attached in another appropriate manner, depending on the strength and air-tightness requirements of the airbag. Although specific configurations of the airbag including cells, delivery tube, means for restricting fluid flow between the cells (e.g., stitching and/or ovals 56) is provided in FIGS. 1 and 2. It is understood that the airbag 10 can be constructed in numerous configurations which may or may not include the specific elements illustrated in FIGS. 1 and 2. For example, in FIG. 2A, the means for restricting fluid flow may be provided by stitching only or there may be no means for restricting fluid flow between the cells. Also, the diffuser tube may be fabric or constructed alternative materials as will be discussed herein. Still further, the configuration of the airbag may vary including the location number and size of the inflatable portions as well as the un-inflatable portions.

Referring now to at least FIGS. 3-11B and in one exemplary embodiment and for providing strength to an unsealed seam, such as those disclosed in U.S. Publication No. 20110057425; U.S. Pat. No. 7,784,822; and U.S. Publication No. 20090127837, now U.S. Pat. No. 7,971,899 a 3rd exterior layer of fabric is sewn to the cushion in conjunction with the unsealed seams that are exposed to pressure from the inflation of the cushion, which have been found to help further reduce leakage. As used herein, "unsealed seam" refers to the seams disclosed in the aforementioned publications and patents corporative herein wherein two layers of the inflatable cushion are only secured together by a plurality of stitches and no other materials (e.g., adhesives, etc.). In one embodiment, this $3^{rd}$ exterior layer of fabric is sewn directly on the unsealed seam.

Figure 6A:
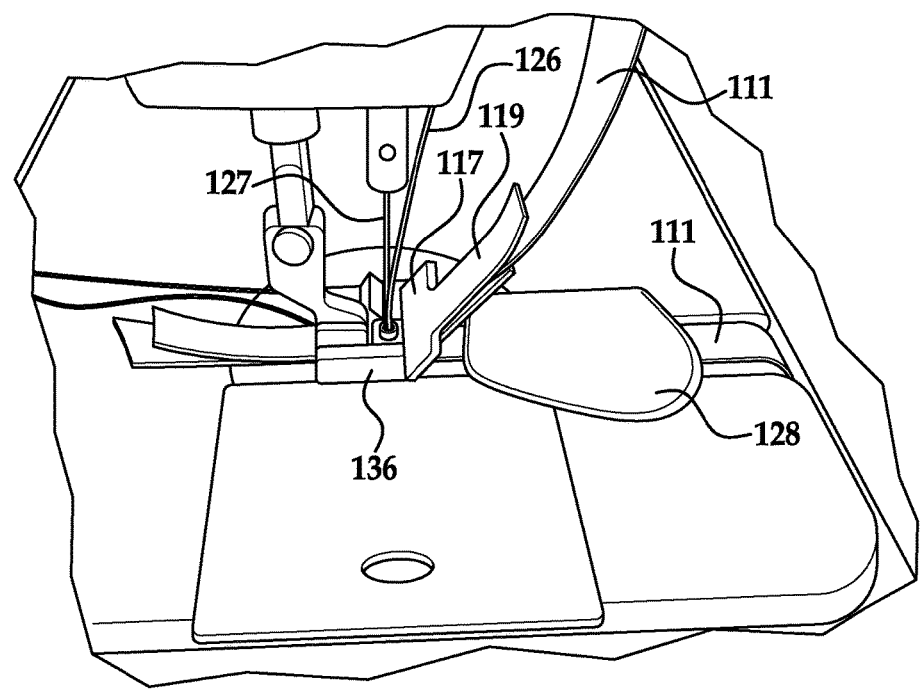
Figure 6B:
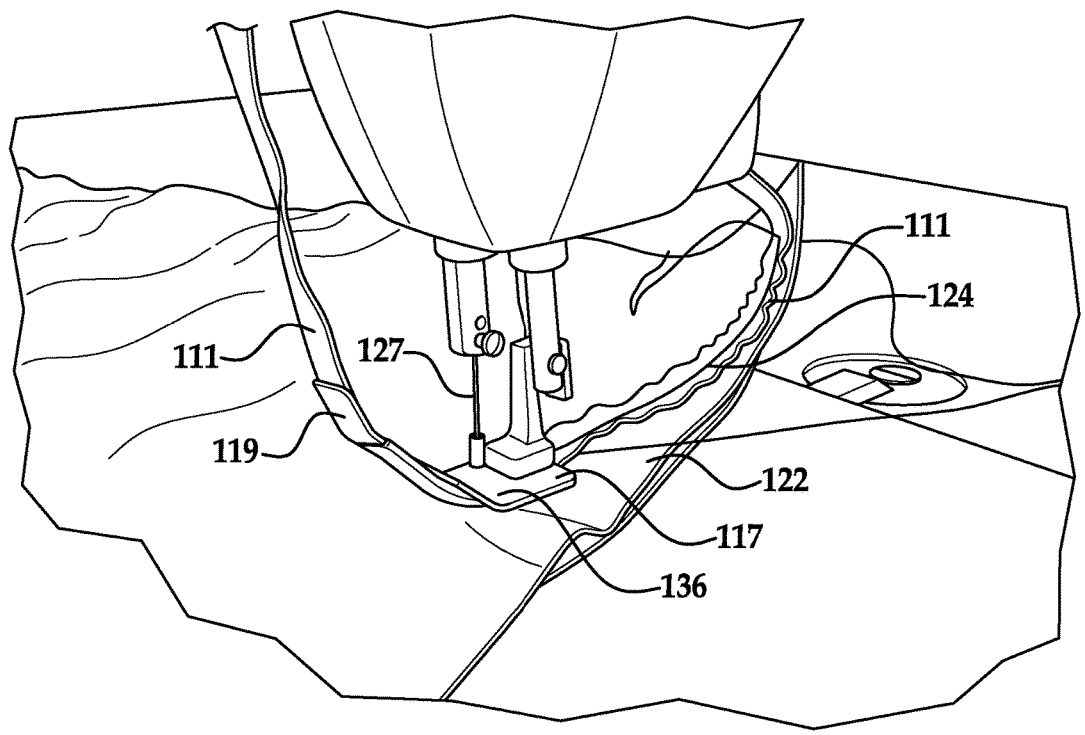
Figure 7:
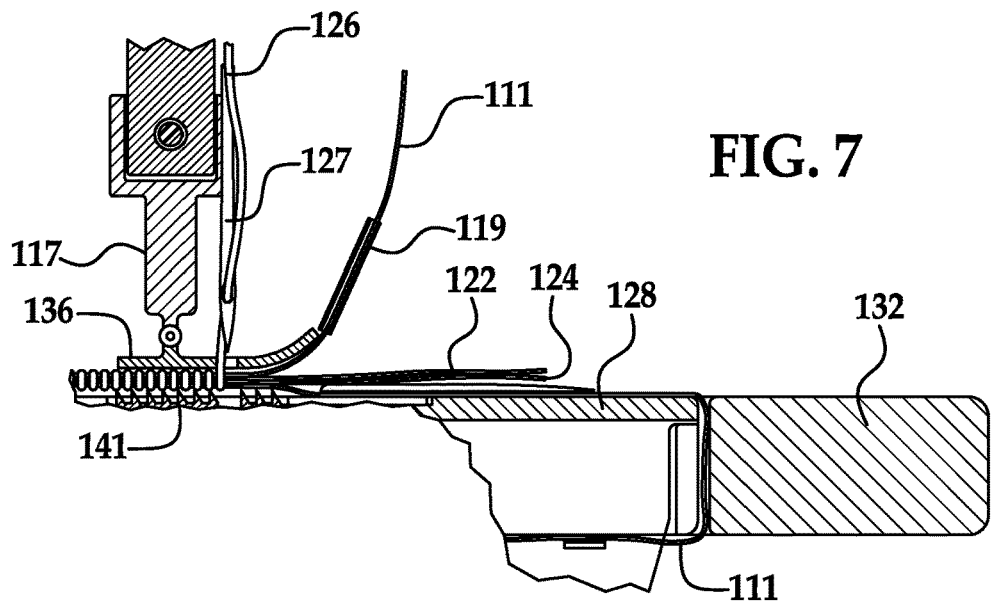
FIGS. 7-9B are views of sewing arrangements for simultaneous feed of a ribbon fabric to the seam.
Figure 8:
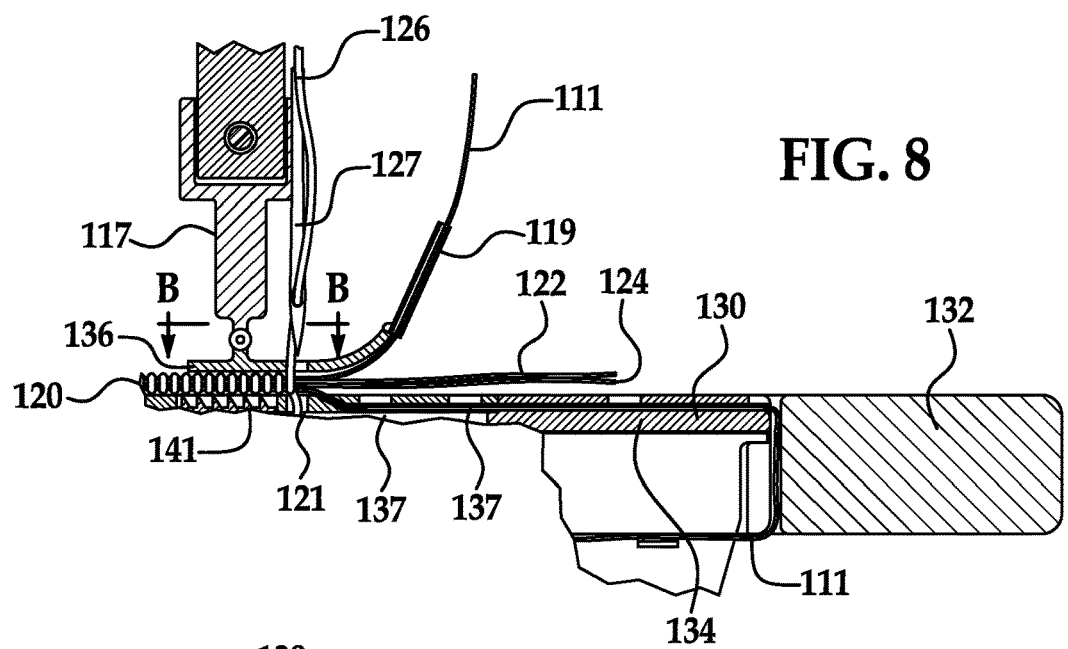
Figure 8A:
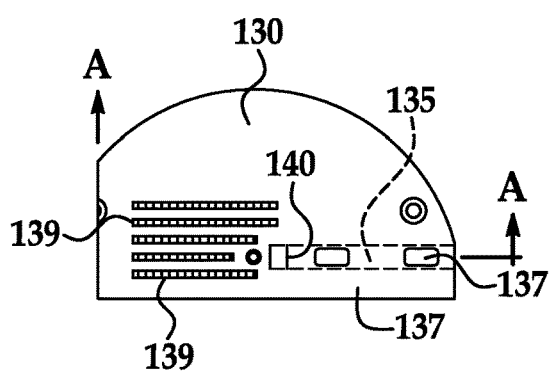
Figure 8B:
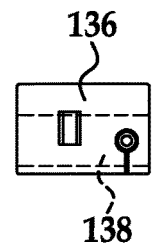
Figure 9:
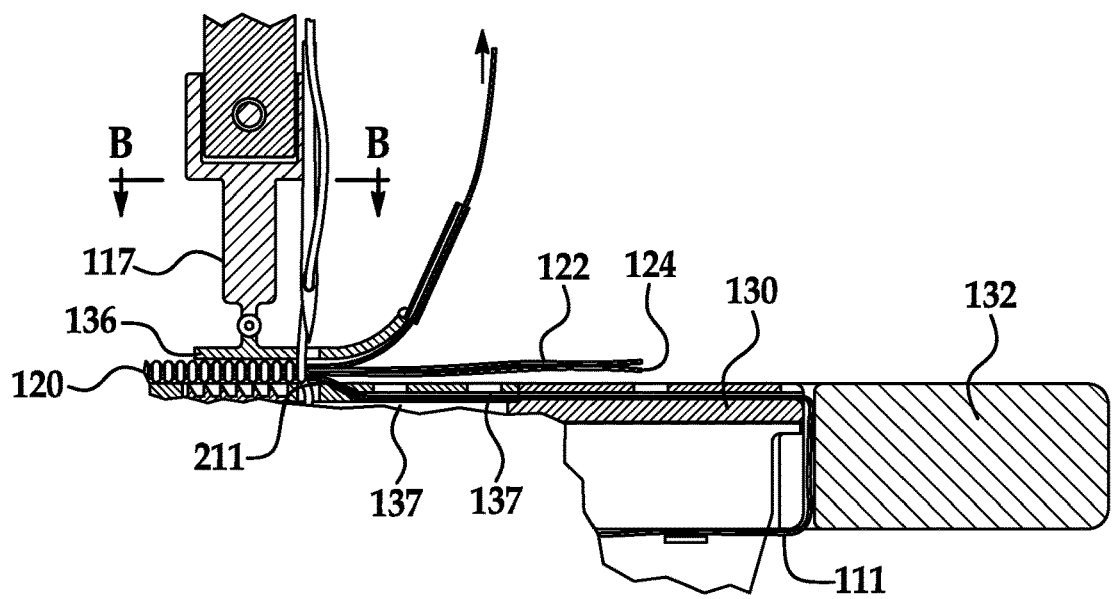
Figure 9A:
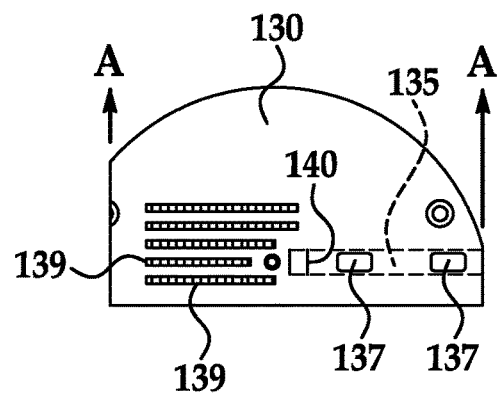
Figure 9B:
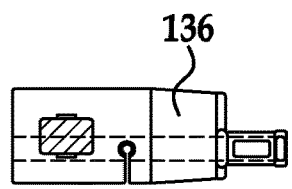

As illustrated in FIG. 6B, this $3^{rd}$ fabric layer is positioned on the needle side during the sewing process which has been noted to typically have a higher leak rate than the bobbin side of the cushion. Therefore, positioning the un-inflated fabric layer to be sewn together as a 3rd layer when the inflatable panels are sewn will be advantageous for increased pressure retention. Furthermore, sewing this 3rd exterior layer of fabric on the needle side of the cushion is most favorable for decreasing cushion leakage.

An additional embodiment taking advantage of this 3rd exterior layer to reduce leakage may utilize a 3rd layer on selected seam areas. For example, lower cost polyester fabric panels with "strips" of polyester fabric used as a 3rd external layer. Tests have found that adding this 3rd exterior layer to seams on the needle side substantially increased the cushion pressure retention over time in a 420 denier polyester with otherwise inadequate leakage performance without the $3^{rd}$ exterior layer. It should also be understood that having an additional (or a 4th exterior layer if using exterior layers on both sides of the cushion) exterior layer added to the seam on the bobbin side of the cushion further reduces overall leakage, albeit not to the same degree as an exterior layer added to the needle side.

As mentioned above, the use of an additional exterior layer of fabric or other membranes of various types to the seam allows for reduced overall cushion leakage. In addition, it is also noted that this benefit was greater with the exterior layer being applied on the needle side of the cushion verses the bobbin side, however if used on both sides additional benefit is found.

In order to further benefit from the additional exterior layer(s), a cost efficient application of the exterior layer(s) is desired, in order to bring enhanced performance for rollover applications in the sewn unsealed low leak cushions. In one implementation, the third or fourth or both exterior layer(s) only needs to cover the seam itself so it can be a relatively small quantity of material, for example, application of "strips" or "ribbon" of fabric can be used to cover an unsealed pressure seam.

In one non-limiting application, these strips of fabric can be narrow fabrics or similar suited items that run along the length of the pressure seam. As used herein a pressure seam is any seam of the airbag or inflatable cushion that is exposed to gas pressure when the cushion is filled with gas.

In accordance with exemplary embodiments of the present invention various ways are provided for fabricating the unsealed cushion utilizing the exterior layer(s) on the seam. One method discovered to be simple and very cost effective is to add the 'strip" or narrow fabric 'ribbon" layer to the needle side of the cushion as the cushion is being sewn by feeding the exterior layer or narrow strip of fabric (or ribbon fabric) into the needle "automatically" without having to position it by hand and thus have it fed into the needle through a positioning device/fixture on or close or incorporated into the sewing machine's presser "foot".

The presser foot is used to press against the base fabric layers being sewn while the needle is positioned within an opening in the presser foot. The needle penetrates the fabric layers and creates the seam. This can also be achieved with a roll of narrow fabric (or ribbon fabric) which is fed in from a spool of the ribbon fabric positioned overhead and out of the way of the machine operator. Of course, the narrow strip of fabric or ribbon fabric can be positioned in any other alternative location to be automatically fed into the needle, on top of the base fabric being sewn together. The presser foot also serves the purpose of pushing the fabric layers down against an engagement claw on the table face of the machine. This is also referred to as the needle plate which has grooves cut within it to allow the claw(s) to move up and down to advance the fabric layers through the machine as the seam is created.

The preferred machine utilized is a drop feed machine creating a single lock stitch seam. The engagement claw assembly found to be most effective is a multi claw which has claws around the needle hole (e.g., front back and/or both sides of the needle hole).

In addition, it has also been discovered that an additional external fabric ribbon strip can be added to the underside of the fabrics being joined together by the seam. As discussed herein, this would be the 4th layer or additional external strip of fabric added to the bobbin side of the cushion. It can be fed into the needle in a similar fashion as with the needle side, only fed in beneath the base fabric layers instead of on top through the modified presser foot assembly. The bobbin side ribbon layer can also be fed from a spool of the ribbon fabric where the spool may be positioned underneath the sewing table or alternatively also positioned above the table out of the way of the operator. Other storage locations of either spool are also possible and the ribbon layer is simply channeled through whatever desired path to get to the needle. Similar to the unsealed seam and in accordance with an exemplary embodiment of the present invention, the external strips or ribbons of material are also only secured to the cushion fabric by the plurality of stitches and no other materials (e.g., adhesives, etc.) are used to secure the strips or ribbons to the inflatable cushion. Moreover, these strips or ribbons are supplied and secured to the seam during the same stitching process that secures the two layers of the inflatable cushion together.

In one example found to work effectively is to channel the bobbin side external ribbon layer underneath a "spoon" or a device that allows the base fabric to slide over prior to being fed into the needle.

Figure 3:
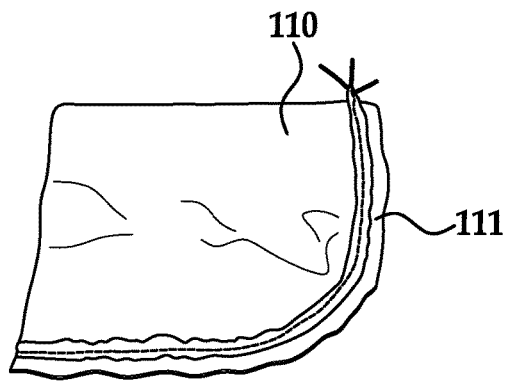
FIGS. 3 and 4 are views of a portion of an airbag having a seam constructed in accordance with one non-limiting exemplary embodiment of the present invention.
Figure 4:
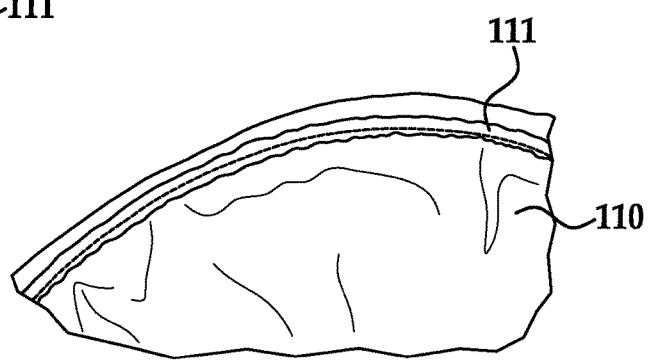
Figure 5:
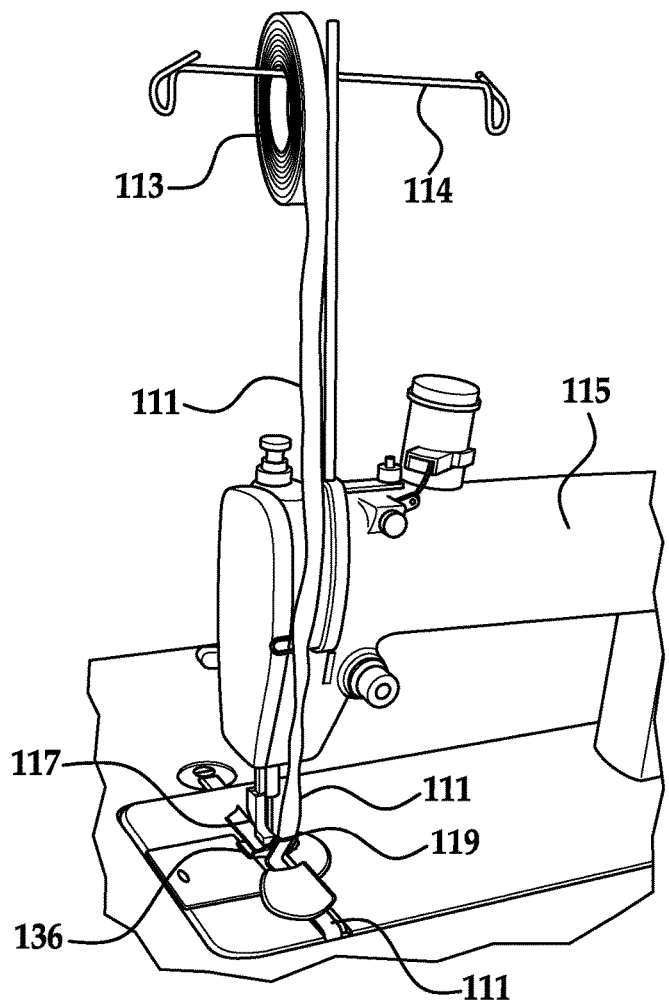
FIGS. 5-6B are views illustrating an apparatus and method for forming seams of an airbag in accordance with non-limiting exemplary embodiments of the present invention.

For example, the attached FIGS. illustrate fabric ribbon 'strips" 111 attached to or being attached to an inflatable cushion constructed in accordance with exemplary embodiments of the present invention. For example, the strips 111 can be quite narrow (e.g., ¼", ⅜" etc.) and be attached to the cushion quite similar to like simply having additional thread added into the seam. FIGS. 3 and 4 illustrate a portion of an inflatable cushion 110 wherein the 3$^{rd}$ and 4$^{th}$ exterior ribbon layers 111 are treated somewhat as simply a 3$^{rd}$ and 4$^{th}$ "thread". As a seam section is completed the 3rd and 4th exterior layers (needle side and bobbin side respectively) can also simply be cut or trimmed similar to trimming or cutting the thread at the completion of a seam. This can also be automated just as it can be with the thread trimming instead of the operator needing to do it by hand.

For example and as illustrated in FIGS. 5-9B, the ribbon layer 111 is continuously fed from a spool 113 rotatably mounted to a structure 114 as a seam is being stitched by a sewing machine 115. As mentioned above, the ribbon layer 111 can be continuously fed to both sides of the seam (e.g., bobbin side and needle side). Alternatively, the ribbon layer 111 is only applied to either the bobbin side or the needle side as the seam is being stitched. In order to provide this continuous feeding a modified presser foot assembly 117 is provided. The modified presser foot assembly 117 has a guide member 119 configured to receive the ribbon layer 111, which will now be referred to as the needle side ribbon layer 111'while the bobbin side ribbon layer is referred to as 111".

As illustrated in the attached FIGS., a seam 120 is formed by stitching two layers 122 and 124 of the airbag 110 together by passing a thread 126 and a needle 127 through each of the layers 122 and 124 as well as the needle side ribbon layer 111' and/or the bobbin side ribbon layer 111", which as mentioned above can include both the needle side ribbon layer and the bobbin side ribbon layer or alternatively only one of them or as mentioned in the previous publications show ribbon layers and just an unsealed seam. In addition, a bobbin thread 121 is fed from a bobbin (not shown).

In order to continuously feed the bobbin side ribbon layer 111", a spoon 128 is provided wherein the bobbin side ribbon layer 111" is continuously fed from underneath. This allows the bottom side or bobbin side ribbon fabric layer 111" to be continuously fed from a location that is out of the way of the operator. In an alternative configuration and as illustrated in at least FIGS. 8 and 9, the spoon 128 is replaced by a plate or needle plate 130. Plate 130 allows the bottom ribbon layer 111" to be fed from underneath a table 132 of the sewing machine or sewing machine apparatus. The plate 130 and a portion of the sewing machine base 134 define a channel 135 that allows for the bobbin side ribbon 111" to be fed under the fabric layers 122 and 124 as seam 120 is formed. In one embodiment, the channel 135 is formed by plate 130 and base 134 alternatively, the channel 135 is formed solely by plate 130 and/or base 134. Plate 130 also has a plurality of access openings 137 that allow for access to the bobbin side ribbon layer 111". In addition, plate 130 also has an outlet slot or opening 140 allow for the bobbin side ribbon layer 111" to be fed into the seam 120 as its being formed. Also shown, are openings 139 for a claw 141 of the sewing machine 115.

Similarly, the foot 136 of the presser foot assembly 117 also has a channel 138 defined therein to allow for the continuous feeding of the needle side ribbon layer 111'.

FIGS. 10-10B illustrate a seam 120 formed in accordance with one exemplary embodiment of the present invention wherein a needle side ribbon layer 111' and a bobbin side ribbon layer 111" are continuously fed into seam 120 as layers 122 and 124 are stitched together along with the ribbon layers 111' and 111".

Alternative methods for attaching an exterior layer or providing a ribbon is to fold over the outer edge of one of the layers 122, 124 of the base fabric of the inflatable cushion to make it become the exterior layer, this can be done in several different ways as shown in at least FIGS. 11B-11D. FIG. 11A illustrates layers 122 and 124 secured together via seam 120 wherein a third piece of fabric 150 is folded around the peripheral edge of both layers 122 124 as seam 120 is being formed. Alternatively and in FIG. 11B, the top layer 122 is folded over well the bobbin side ribbon layer 111" is provided to seam 120 as mentioned above. In yet another alternative and in FIG. 11C both layers 122 and 124 are folded over each other at the edge as seam 120 is formed. FIG. 11D illustrates layer 124 being folded over while the needle side ribbon layer 111' is applied to the seam 120.

If this fold over is done with the needle side base fabric layer where it then also becomes the 3rd layer on the bobbin side then the automatic feed of a narrow fabric layer can be utilized on the needle side of the seam or vice versa. Again, having both sides of the cushion utilize an exterior layer on the seam will bring the most benefit for overall pressure retention over time.

The fold over is also accomplished automatically as the operator feeds the base fabrics into the sewing needle through a fixture that folds the outer edge back onto itself or onto the opposite layer of base fabric.

A typical salvage edge perimeter found to work best in production is anywhere from 10 to 15 mm of salvage after the perimeter seam. Certainly any other salvage width is practical depending on whether further mounting tabs or tethers may be attached to the perimeter salvage. So, in the options of folding over a fabric layer or adding a fabric layer that wraps the perimeter and both seams of the base fabric layer(s), a larger exterior fabric strip width will be required then in the preferred embodiment, which is not required to extend over the entire perimeter salvage area, as well as the seam The "strips" or ribbon fabric can be cut from flat fabrics into narrow strips. This can be done in several methods known in the art. The fabric can be cut after being rolled onto cardboard rolls and sliced to the desired width. In this example method the ribbon layers are already rolled up ready to install to the machine dispenser holding device. Another method is to transverse wind the ribbon onto a roll in order to increase the quantity of ribbon on a given spool.

It has also been found that cutting a base flat fabric on the bias to the weft and warp can be advantageous when sewing around curves in the cushion. This is compared to cutting the narrow strips parallel to the fabric yarns. By cutting on a bias or 45 degrees to the warp and weft, the fabric strip has been found to not "pucker" and lay flatter around curves than compared to the strips that are cut along the or parallel to the warp or weft. To keep the strip or narrow fabric in a continuous or long ribbon the ends of the cut biased strips can be attached together and then rolled up on a spool. One such method to join the cut strips is to sew the ends together after the strips are positioned together at their ends.

Use of both coated and uncoated fabrics for this exterior layer has been found to work. However, noted the coated fabric having a performance advantage over the uncoated as a ribbon layer. In cases where a coated fabric is used for this purpose, facing the coated surface toward the base fabric as it is sewn has shown some advantages of increased pressure holding capability over the coated surface of the exterior fabric facing away from the base fabric. The base fabrics are typically sewn together with the coated surfaces facing each other or on the interior of the sewn cushion. (Ex, silicon coated fabric) This has also been viewed in the industry as the preferred choice due to abrasion that may remove coating allowing for leakage. It also keeps the fabric from binding during unfolding where if the silicone or other coating is on the outside it could have a higher tendency to bind rubbing silicone surface against another silicon surface. The benefit of using an uncoated fabric as the exterior layer is simply reduced cost. For example, utilizing fabric in this way in such narrow strips allows for very efficient use of the fabric. Since they are straight narrow strips when cut, woven, etc., there is essentially no nesting to be done. Or close to 100% of the roll of fabric can be utilized for the strips or ribbon of fabric. The ribbon strips can be fabricated using a blade cutter capable of cutting multiple layers. The process is simple as well as only straight cuts need to be performed as the roll of fabric is either pulled through the blades or the blades move through the fabric layers to create the ribbon strips of fabric. Or as mentioned earlier, the blade can cut the roll itself into multiple small rolls ready for use.

For example and to show how efficiently and low cost the ribbon fabric can be, the following example is illustrated: Cutting the ribbon fabrics into ⅜" wide strips. Taking a typical 2 row side curtain cushion, with a total seam length of approximately 175 inches and using the external fabric strips on both sides of the cushion and not utilizing the sail panels as a 3rd or 4th external layer, the total length requirement for the ribbon fabric to cover both sides would be approximately 350 inches. If the external ribbon layer used a premium fabric such as a 53×53 weave count of a 420 denier with 35 g of silicon coating per square meter, the cost for this fabric today in volume is approximately $2.25/square yard (1 sq yd=1296 inches squared). 350 inches of the ribbon fabric in the ⅜" width would utilize approximately 131 square inches of fabric or converted to sq yards=0.101 sq yds. This would have a cost of approx 0.23 cents. If a lower cost fabric such as an uncoated 630 denier at a cost of $1.55/sq yd is used the cost for the ribbon fabric for both sides of the cushion would be approx 0.16 cents. So, for a relatively small cost for the ribbon fabric the pressure retention of the sewn cushion can be significantly enhanced as shown in the examples in the chart of FIG. 12. Alternatively, if the ¼" width ribbon layers found effective were used, the cost would be further reduced. Further, the ¼' width also may be the width of choice due to its handling more like a simple $3^{rd}$ and $4^{th}$ 'thread' than the ⅜" or larger widths.

Another exemplary embodiment of the present invention is where one of the base layers of fabric is cut just oversized compared to the mating section it will be sewn to. Accordingly, the outer edge of the larger cut section will be folded over and sewn back onto itself or onto the mating fabric layer when sewing the cushion.

As mentioned, a width found effective for this exterior layer "strip" is ⅜". Ribbon strips as small in width as ¼" have also been added effectively to the cushion even around standard cushion seam curves. Of course larger widths can be utilized but as the width increases so would the cost. The width needs to be wide enough where the sewn seam always falls within the width of the narrow exterior layer even as the sewing operation goes around curves. It has been found in early prototype machine set-ups that the seam may wander off the center of the narrow exterior layer as the base fabric is turned by the operator during sewing. Therefore the width is wide enough to compensate for this occurrence. Non-limiting examples of effective widths include the following dimensions ¼", ⅜" and ½" while ⅜" or ¼" appears to be a good width to use for most cushion applications. Of course, other widths greater or less than the aforementioned values are considered to be within the scope of exemplary embodiments of the present invention.

As mentioned in prior applications and patents incorporated herein by reference thereto, sail panels can be used as the exterior layer in the sections of the seam where they may be located. This eliminates the need for a separate exterior layer to be added by the automated feed from a spool or other methods mentioned. In these areas the operator simply needs to cut the feed of the narrow fabric on the side of the cushion where the sail panel will be sewn into the cell pressure seam and then resume the exterior ribbon layer again once past the area of the sail panel. For simplification of the sewing it is also anticipated to simply use the ribbon strips as the 3rd and 4th layers instead of utilizing the sail panels for such.

Alternatively, the $3^{rd}$ or $4^{th}$ ribbon layer can be sewn over the sail panel as well as the base fabric layers. In this case there would be 5 total layers of fabric within the pressure seam.

Figure 12:
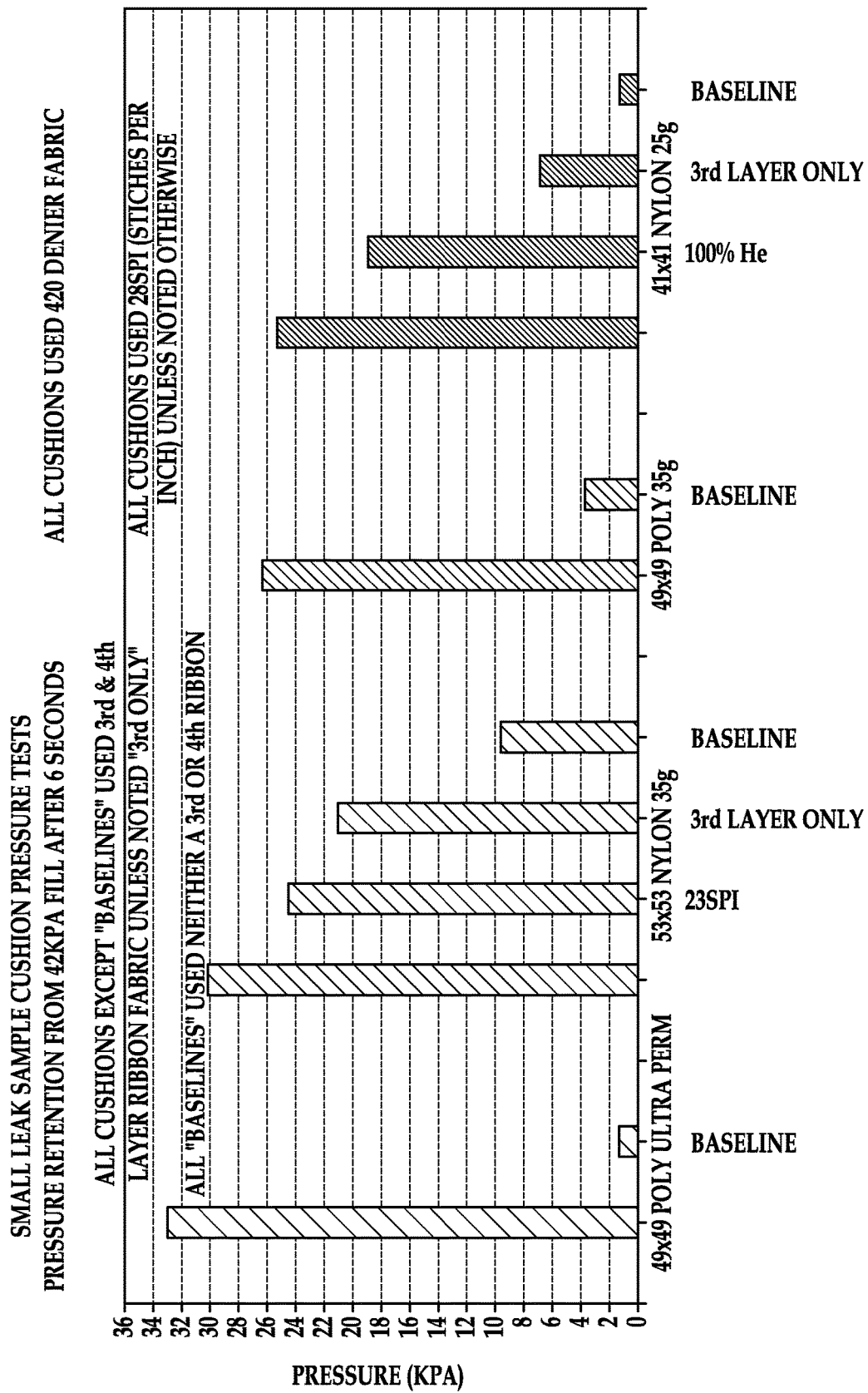
FIG. 12 is a graph illustrating performance of airbags seams in accordance with various embodiments of the present invention.
Figure 13:
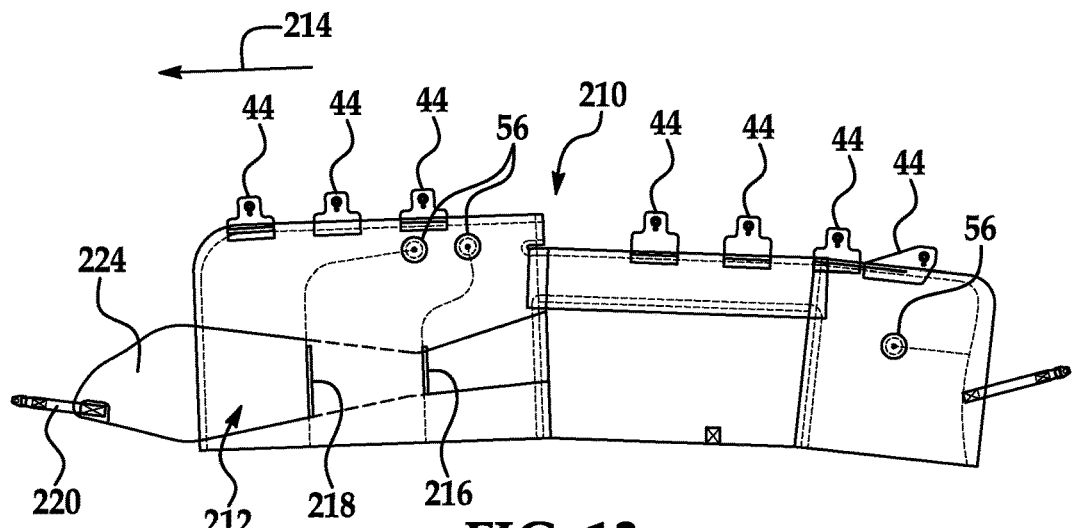
FIGS. 13-18 illustrate airbags constructed in accordance with exemplary embodiments of the present invention.

Referring now to the Chart of FIG. 12, tests were conducted on sample cushions comparing cushions utilizing a 3rd layer of ribbon fabric on the needle side of the cushion to one without the 3rd layer. Tests were also conducted comparing the use of a ribbon fabric exterior layer on both sides of the cushion otherwise known as a 3rd and 4th layer of external ribbon fabric. All other variables were held constant such as thread type, tensions for both bobbin and needle, stitches per inch (SPI) of the seam density and base fabric. The Sample cushions were tested using shop air where the samples are filled to 42 kpa and then the shop air supply is shut off and the pressure decay is monitored over a 6 second time frame. A pressure of 42 kpa was chosen because that is close to a typical cushion peak pressure in a "Diode" Low Leak Sewn Unsealed Seam cushion. In all cases the samples using the 3rd or 3rd and 4th layer(s) resulted in substantially improved pressure retention over the Baseline seam sewing which did not utilize the external fabric layers.

In one comparison the pressure retention increased just over 3 times more at the 6 second time frame using 3rd and 4th layers compared to the Baseline without the external fabric layers (53×53 420 denier nylon 35 gsm silicon coating base fabric example). The pressure went from 9.6 kpa to just over 30 kpa @ 6 sec. The pressure went from a 9.6 kpa at 6 sec to 21 kpa @ 6 seconds using the 53×53 fabric with 35 g silicone coating and a 3rd exterior layer only. In both these examples the same base fabric was also used as the fabric choice for the narrow external fabric layer(s).

Another alternative the exterior layer of fabric offers is to reduce the SPI of the seam density utilized in order to possibly decrease overall sewing times. For instance, comparing to the above example when the same 53×53 fabric was sewn using a 23 SPI the pressure at 6 sec was 16 kpa vs the 21 kpa that had a 28 SPI seam density. Both compare to the baseline 28 SPI with a 6 sec pressure of 9.6 kpa that did not utilize the 3rd or 4th exterior layer.

Tests were then performed utilizing 100% helium instead of shop air. There was a noticeable further loss in pressure using the helium versus the shop air. Helium has a smaller gas molecule compared to the majority of the gas molecules in air so the helium finds more gas molecules leaking through similar leak paths as compared to the shop air.

In another example a fabric with a 41×41 weave count, also 420 denier and 25 grams silicon coating per square meter (gsm) was used. In the case of the Baseline test (high density seam without external fabric fabric(s), the cushion leaked quite substantially with only 1.3 kpa remaining at 6 seconds. The results using the 3rd and 4th layer of external fabric were substantially higher than the baseline with over 25 kpa remaining at 6 seconds compared to the 1.3 kpa or almost 20 times more pressure retention! In effect, the 3rd and 4th external fabric layers allow for a low cost fabric that would not even be considered for use in a rollover cushion to now provide exceptional pressure performance characteristics. The 41×41 weave construction is a lower cost nylon fabric choice and also offers a mass and packaging advantage over higher weave count fabric constructions.

Other fabric examples are the use of a polyester fabric for reduced cost. Similar to the 41×41 fabric the use of polyester fabric that would otherwise not even be able to be considered can now work for the rollover cushion using the 3rd and 4th layer construction. An example of polyester fabric is also shown in the histogram chart. One that used a 49×49 weave in a 420 denier with an Ultra Perm coating that is added in a dipping process that adds coating to both sides of a fabric sheet.

So, depending on the application pressure requirements, mass, cost and or packaging requirements various options exist for meeting increased pressure performance or the use of lower cost fabrics for the sewn cushions that could not have been even considered before for a rollover performance cushion It should be understood that while this invention discusses the use of the low leak seam in side curtain application, any other airbag application may use the same low leak seam construction. Even applications that don't require extended pressure retention performance can benefit from the low leak seam. For example, the adding of the $3^{rd}$ or $3^{rd}$ and $4^{th}$ external layers allows the seam to have reduced comb stripping when pressure and tension is applied to the seam. The external layer(s) add integrity to the seam. So, in this example a lower denier fabric construction that had been found previously to be too "weak" for a particular application due to failure or too high of leakage at the seam may now again be a candidate for the application. Say a 210 denier fabric construction that previously failed at the seam during filling by an inflator. Now, with the same 210 denier fabric and the $3^{rd}$ and $4^{th}$ exterior fabric layers added the seam no longer fails in the same inflation application. What this in effect does is allows the application to now utilize the lower denier construction as the main fabric panels instead of having to use the next higher strength construction such as a 315 denier fabric which brings a mass and packagability disadvantage. By packagability it is meant that when the airbag is folded and wrapped up to be packaged in its application, the size of the package or "envelope" of the folded airbag will package better-smaller with a lower denier fabric than a higher denier fabric. So, the lower denier option is said to have better packagability.

Airbag applications that may benefit from this invention range from automotive side curtains, knee bags, between passenger bags, drivers bag, passenger bags, side impact bags, roof bags and even other vehicles such as large trucks, buses trains and even aircraft. On an aircraft the mass and packaging of the cushion become very important design features. Due to the lower denier fabric, lower mass becomes a benefit.

Referring now to FIGS. 13-16 an "Enhanced Sail Panel" or "Trampoline" embodiment is illustrated. Reference is also made to the following U.S. patent application Ser. No. 12/859,529 filed Aug. 19, 2010, which claims the benefit of U.S. Provisional Patent Application Ser. No. 61/235,328 filed Aug. 19, 2009 the contents each of which are incorporated herein by reference thereto.

Further improvements have been found utilizing an exterior layer(s) of lower cost uncoated fabric or other inexpensive material on the outsides of the pressurized cell(s). In a preferred embodiment a relatively narrow width of fabric is used and is channeled as shown in at least FIGS. 13-18.

Figure 14:
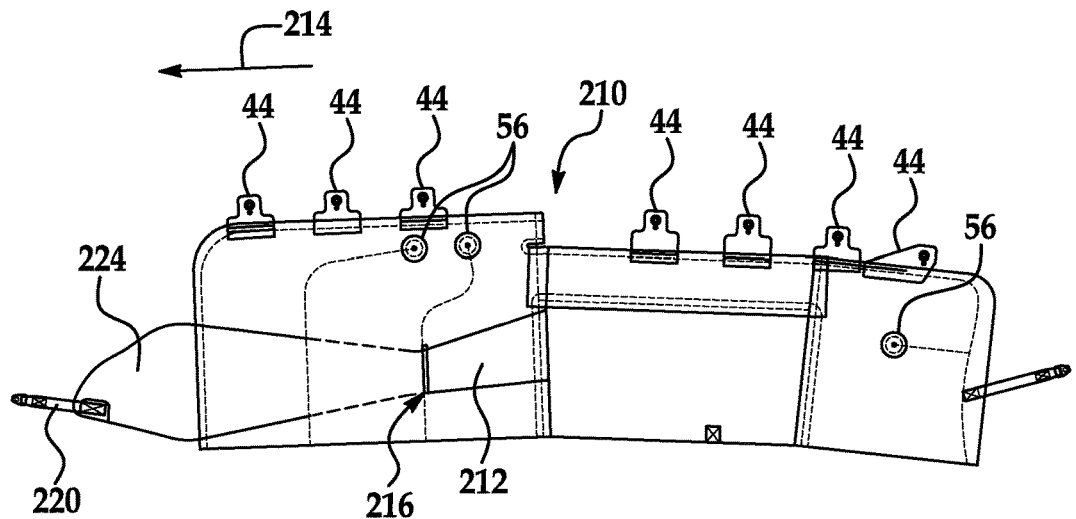
Figure 15:
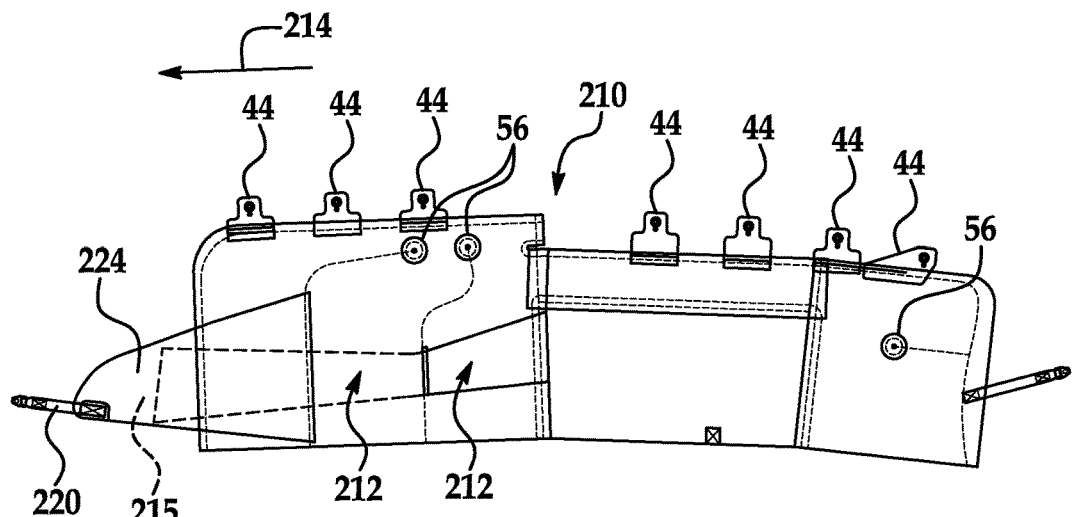
Figure 16:
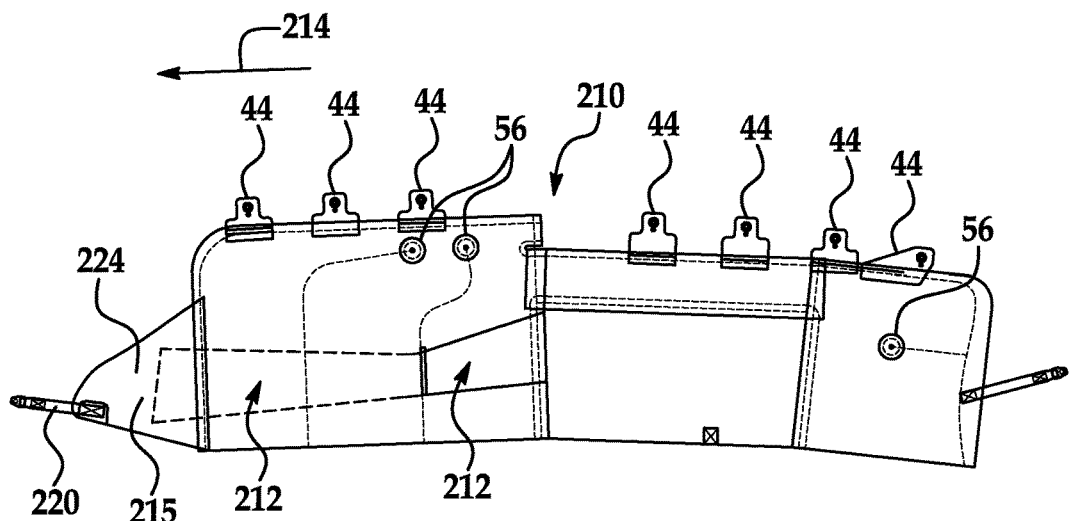

As illustrated in at least FIGS. 13-16 various options for the enhanced sail panels ("Trampoline") for an airbag or inflatable cushion 210 are provided. In the one embodiment there is an un-inflated fabric portion or member (or other material substrate) 212 that is sewn to the rearward and inboard side of cell 3 (illustrated in the attached FIGS. or other cell that is positioned over the vehicle pillar when inflated). It is understood that the member 212 may comprise any suitable material and may be secured to any portion (inflatable or un-inflatable) of the inflatable cushion in order to provide the desired performance and the locations of securement are not specifically limited to those illustrated in the attached drawings. The fabric portion or member 212 then transverses over cell 3 in the direction of arrow 214 (towards a forward end of the inflatable cushion and a forward end of the vehicle the inflatable cushion is secured to) and through a slot 216 located between cells 2, 3. The fabric member 212 then continues to transverse over both cell 2 on its outboard side and then passes through another slot 218 located between cells 1 and 2 and transverses over and inboard side of cell 1 and extends past the forward end of the inflatable cushion 210 which may be over a handle on the A-pillar and over the outer surface of a portion of the A-pillar or may simply attach under the pillar trim As illustrated, the fabric member 212 extends towards a front tether assembly 220 and then to the A-pillar. As illustrated and in one embodiment, the fabric member 212 also comprises a portion of a front sail portion 224 of the inflatable cushion 210. Alternatively, the fabric member 212 Extends to and attaches to a separate front sail panel 226 as shown in FIGS. 15 and 16.

The seam in which the fabric member is secured to on the rearward side of the cushion (cell 3 rearward seam) was chosen in this embodiment because that particular cell is the cell that when inflated inflates over some or all of the B pillar of the vehicle (pillar between front row of seating and the second row or "backseat"). Thus, the B-pillar will generally keep that part of the cushion more inboard even when the cushion is being forced outboard by an impacting occupant. This makes that cell more ideal for the width of fabric to be secured to at its perimeter as shown. This allows the fabric member to be lifted more inboard upon inflation and even pull the cells it supports on the outboard side more inboard to better resist occupant excursion through the window.

With reference to the above embodiments, the fabric member may be secured to a seam 120 such that it provides an exterior layer applied to the seam as mentioned above.

As the fabric member is passed over the inboard cell(s) and under the outboard inflated cells the tension in the fabric member is increased substantially when the cells are inflated, since the front of the fabric member extends to or is connected thereto and anchored under the A-pillar to the vehicle frame. Also, locating (sewing) the rearward end of the fabric member to the rear side of cell 3 allows the member to be lifted inboard, when the cell inflates, and more toward the occupant and away from the window opening or vehicle structure.

In doing so, the width of fabric can pull the front end cells more inboard (depending on the location of the member 212 with respect to the inflatable cells) and add even significant resistance to pushing the curtain outboard when the occupant interacts with it during a collision or rollover event. The end result is a situation where excursion of an occupant is reduced even further compared to the inflated cushion alone without this additional countermeasure to reduce occupant excursion. In this case, a small advantage is also gained by the exterior width of fabric suspending over two seams between cells. By doing this it can further reduce the penetration of an object into the cushion (such as a pole that would otherwise move more into the seam area versus the seam area covered by the suspended fabric width). Accordingly, at least two advantages are obtained by the fabric width member. This can also be done on the inboard surface of the airbag as shown in the attached FIGS. or even both sides. A further advantage of the support member 212 fabric width is it distributes the impact energy. An occupant pushing outward on the front cells or even un-inflated sail panel compresses cell 3 as well due the link via support fabric member 212. For example, the height of the slots (top to bottom) and corresponding height of the portion of the fabric material may be varied from slot to slot or in the case of a single slot vary the height to provide varying degrees performance Still further, the location of the slots may vary accordingly to also provide varying degrees of tension and/or performance.

A small ramp can be used at the top of the A-Pillar similar to those known in the art to allow a fabric portion or airbag to slide down and be pulled over the A-pillar trim or molding. In this case the fabric is pulled over the A-pillar and A-pillar handle when deployed. Conventional curtain airbags are pulled down and slide down underneath the A-pillar trim molding or pop the A-pillar out or inboard so the sail panel portion or the airbag can deploy downward behind the A-pillar cover (trim).

The fabric member or sail panel is anchored or attached to the vehicle structure under the A-pillar by means known in the art or with the option shown in FIGS. In this embodiment the attaching part is an extended anchor 220 which connects the sail panel and or fabric member to a forward mount location on the vehicle.

One embodiment found effective with an anchor extension feature is to utilize an existing non rotation hole typically just below or above the conventional front tether anchoring thread on a vehicle. This allows for the anchor to be mounted to the existing vehicle anchor point yet extend much further below this point compared to conventional front anchors. Having a 'pin" or additional feature to position into the anti rotation hole will keep the extended anchor feature from pivoting excessively once loaded by an occupant to further increase the effectiveness of the extended anchor feature. At the end further from the anti-rotation mount is where a fabric tether may be located. This allows for the sail panel anchoring point to be lower and for the sail panel to reach to a lower tensioning location within the window opening.

As mentioned above FIG. 13 illustrates two slot openings 216 and 218 created between the cells, which in the illustrated embodiment are between cells 1-2 and 2-3. In one embodiment, the slot between cells 2 and 3 is a "full" slot where the narrow width fabric member passes freely through the slot over the entire width or the member. In the slot between cells 1-2 the slot has a midsection that the slot is discontinued and then restarted after a small length. In this embodiment about one or two inches so about 2½" of slot opening, then about 1½" of connection between cells then another 2 ½" of slot opening again. This keeps the gap (separation between cells) between cells smaller on this slot opening area compared to the slot opening between cells 2 and 3. The slot opening, while allowing the fabric member to pass through, also tends to increase the gap between the cells as there is a "tension relief" given in that particular area. What has been discovered is this also allows for the cells most adjacent to the slot opening between the cells to inflate to a slightly greater thickness in that area. (crossvehicle). This can be advantageous having the thicker cell to resist occupant penetration or excursion. It has further been discovered that the slot opening also gives a "tension relief"

effect that allows the cells to be pulled slightly more forward and inflated slightly thicker then otherwise without the slot opening(s). This can be done as in the embodiments shown where the lower half of the fabric member portion attaches to the salvage area of the front most cell or alternatively, extends to the front sail panel or even into the front tether and anchor assembly. Alternatively, it can also attach in any other preferred area of the cushion to gain a desired effect. In this case it pulls forward the entire cushion to keep inflated cell areas over a larger portion of the window opening.

In this two slot option the first portion of the fabric member that passes under cell 2 or on the outboard side of cell 2 does a similar function as in the single slot embodiments, where it pulls cell 2 inboard to more effectively help with occupant containment. Then, the fabric layer passes through the front slot to go back to the inboard side of cell 1. Doing this then also allows the portion of the fabric member which is located forward of the inflated cell 1 to take on the "trampoline" effect. This then can allow for occupant interaction with this area of the fabric member to begin sooner then if it was attached to the salvage of cell1 or outboard of cell 1. So, depending on the desired result options are available on how to position or channel the fabric member between or through the various cells of the cushion outboard, inboard or whatever combination is best desired. Many other combinations and variations are also possible and these examples are not to be limiting to the arrangements of the fabric panels traversing the inflated cells.

Each of these fabric member embodiments can also be used in the conventional manner where the conventional front tether/sail panel or fabric member can deploy down behind the A-pillar trim/cover and still gain a benefit.

Figure 18:
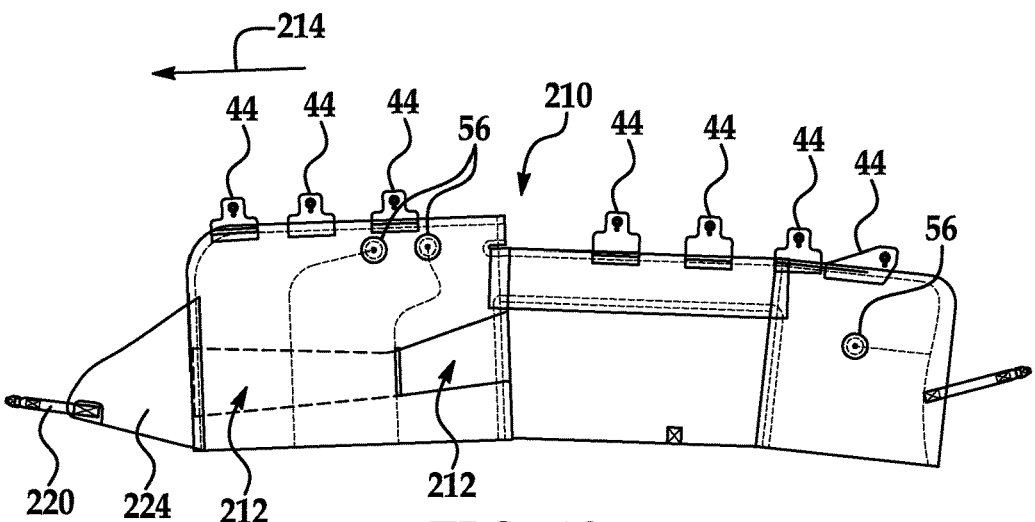

Tests were performed using theses fabric member embodiments in the conventional manner where the front sail panel/cushion deploys behind the A-pillar trim. The tests compared the difference in the same cushion where the fabric member was used to those tests where the fabric member was removed. These particular tests as shown in FIG. 18 have the fabric member attached to the rearward side of the third cell near the seam and then transverses over the inboard side of cell 3 through the slit opening between cells 2-3 and over cells 2 and 1 on the outboard side. The fabric width member was then attached to the front most perimeter seam of cell 1. A front sail panel then extended over the remaining window opening area and attached to the front tether anchor discussed herein, or any other anchoring device.

The tests performed were containment tests using a headform that measures excursion past the window plane. These particular tests used an energy found typical to occur in a rollover event at a time of 1.5 seconds into the event or approximately 300 joules using a 40 pound head-form mass. Two impact locations were chosen representing impact locations known in the industry as A1 and A3. These are the window opening positions at both the top and bottom of the front seat window. The comparison of the test results found that with the fabric width member utilized, the excursion results of the head-form mass was approximately 70 to over 100 mm less excursion than the tests performed in the same locations with the fabric width member removed.

The results show substantial differences by the use of a single layer of low cost uncoated fabric for the fabric width member. In these tests of the 2-row cushion, the fabric cost for material was found to be between 0.15-20 cents. Otherwise, other more costly methods would need to be employed to reduce the excursion such as more inflated area and or much larger volume cells or higher pressures/larger inflator output. All of which would also add significantly more to the overall cost of the module assembly.

It has also been found that the use of the fabric width support member allows for the cushion to meet all containment test objectives without the bottom edge of the inflated cushion overlapping the beltline. (Beltline" is the lower opening ledge of the door window—typically near beltline height of a person.) This allows for a shorter overall cushion height to pass testing compared to a more conventional cushion without a support fabric width member countermeasure that requires the cushion lower edge to overlap the beltline area when inflated. In many instances the conventional cushion must overlap and interact with the beltline structure as much as 80 mm when inflated. This adds quite substantially to the overall cushion size, volume, mass and cost. Whereas with the preferred embodiment shown here utilizing the support fabric width member, a much smaller, lower volume, lower mass cushion can meet test objectives.

A further option to the above configuration is to extend the fabric width member forward of the front most cell perimeter (cell1) and attach it to the front cell panel as shown in FIGS. 15-16. The fabric width member may also act as an outboard enhanced sail panel by sewing it into the seam between the front cell (cell 1) and the next adjacent cell (cell2). This has been found to pull the front cell more inboard to benefit containment performance further. This embodiment may then attach the fabric width member to a standard front sail panel sewn to the front cell forward perimeter as in FIG. 16 or it may attach to an inboard enhanced sail panel as shown in FIG. 15.

The support member/fabric width member feature may also be used in the rearward sections of the cushion. 1. Beginning at the inflated cell over the B-Pillar and extending rearward or 2. On the inboard face of the cell over the C-Pillar, for example, and under or outboard of its adjacent cell forward to it on the cushion.

As illustrated in at least FIGS. 13-18 numerous configurations for the support member or panel 212 are provided. For example, in FIG. 13, panel 212 is secured proximate to cell 3 and traverses across an inboard side of the cell through a slot 216 and then traverses across an outboard side of cell 2 only to pass through a slot 218 to traverse across an inboard side of cell 1. Thereafter, the panel 212 extends forward to provide a sail portion 224. In an alternative embodiment FIGS. 15-16, the panel 212 is secured to a separate sail portion 226.

Alternatively and as illustrated in FIG. 14, panel 212 is secured proximate to cell 3 traverses across an inboard side of the cell through a slot 216 and then traverses across an outboard side of cells 2 and 1 and then extends forward to provide a sail portion 224.

FIG. 15 illustrates an embodiment similar to that of FIG. 14 however the distal end 215 of the panel 212 is secured to the outboard side of the separate enhanced sail portion ("Trampoline') 226.

FIG. 16 illustrates an embodiment similar to that of FIG. 14 however, the distal end 215 of the panel 212 is secured to the outboard side of a more standard separate sail portion 226 that is simply attached to the perimeter of the front cell.

Figure 17:
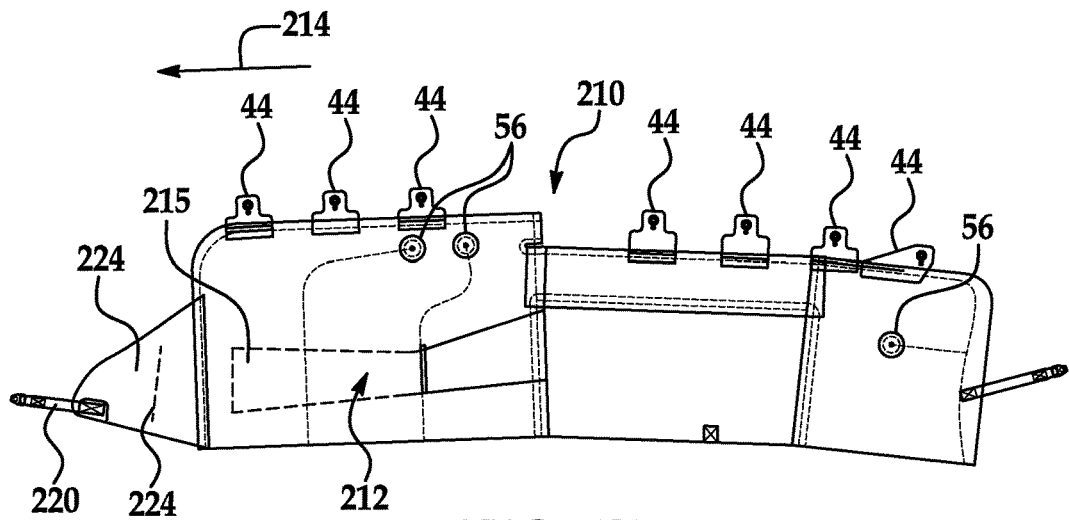

FIG. 17 illustrates an embodiment where the distal end 215 of the panel 212 is shown yet to be secured to the outboard side of cell 1 perimeter and FIG. 18 illustrates an embodiment where the distal end 215 of the panel 212 is now secured to the outboard side of cell 1 perimeter. By securing panel 212 in this fashion it pulls the cell 1 perimeter more rearward toward cell 3. The length of cells 1 through 3 in the un-inflated state are longer than the fabric panel 212.

As used herein outboard refers to the surface of the inflatable cushion facing the exterior of the vehicle while inboard refers to the surface of the inflatable cushion facing the interior of the vehicle Although specific airbag configurations are illustrated in the attached figures is understood that variations thereof are considered to be within the scope of exemplary embodiments of the present invention. For example, the number size and configuration of the cells, non-inflatable portions, the inflatable portions, etc. may vary.

Is also understood that airbags/inflatable cushions constructed in accordance with numerous various exemplary embodiments of the present invention may include any one or all of the embodiments disclosed herein including those mentioned in U.S. patent application Ser. No. 12/813,910 filed Jun. 11, 2010, which claims the benefit of U.S. Provisional Patent Application Ser. No. 61/186,656 filed Jun. 12, 2009 and published as U.S. 20110057425; U.S. Ser. No. 11/190,499 filed Jul. 26, 2005, now U.S. Pat. No. 7,784,822; and U.S. Ser. No. 12/256,224 filed Oct. 22, 2008, and published as U.S. 20090127837, the contents each of which are incorporated herein by reference thereto.

What is claimed is:

1. An inflatable cushion for a side of a vehicle, the inflatable cushion, comprising:
a first portion of material;
a second portion of material, the first portion of material being secured to the second portion of material to define the inflatable cushion;
wherein at least a portion of a peripheral edge of the inflatable cushion is defined by a seam wherein an inner surface of the first portion is secured to an inner surface of the second portion only by a plurality of stitches; and
wherein a ribbon strip of a third portion of material is simultaneously secured to the seam on an outer surface of either only the first portion or only the second portion only by the plurality of stitches and wherein the ribbon strip of the third portion of material is continuously fed from a spool as the plurality of stitches are applied, wherein a ribbon strip of a fourth portion of material is simultaneously secured to the seam on an outer surface of either the first portion or the second portion opposite the ribbon strip of the third portion of material by the plurality of stitches, the ribbon strip of the fourth portion of material being completely separate from the ribbon strip of the third portion of material and wherein the ribbon strip of the fourth portion of material is secured to the seam only by the plurality of stitches.

2. The inflatable cushion as in claim 1, wherein the ribbon strip of the fourth portion is continuously fed from a spool as the plurality of stitches are applied.

3. The inflatable cushion as in claim 2, wherein the inflatable cushion maintains an internal pressure in a range of greater than 10 KPa for at least 6 seconds after the inflatable cushion is inflated.

4. The inflatable cushion as in claim 1, wherein the ribbon strip of the third portion of material and the ribbon strip of the fourth portion of material is a coated fabric.

5. The inflatable cushion as in claim 4, wherein the inflatable cushion maintains an internal pressure in a range of greater than 10 KPa for at least 6 seconds after the inflatable cushion is inflated.

6. The inflatable cushion as in claim 1, wherein a width of the ribbon strip of the third portion of material and a width of the ribbon strip of the fourth portion of material is no greater than ½ of an inch, wherein the width is defined as a distance extending across a surface of the first portion of material or a surface of the second portion of material.

7. The inflatable cushion as in claim 6, wherein the inflatable cushion maintains an internal pressure in a range of greater than 10 KPa for at least 6 seconds after the inflatable cushion is inflated.

8. The inflatable cushion as in claim 1, wherein a width of the strip of the third portion of material and a width of the strip of the fourth portion of material is no greater than ⅜ of an inch, wherein the width is defined as a distance extending across a surface of the first portion of material or a surface of the second portion of material.

9. The inflatable cushion as in claim 8, wherein the inflatable cushion maintains an internal pressure in a range of greater than 10 KPa for at least 6 seconds after the inflatable cushion is inflated.

10. The inflatable cushion as in claim 1, wherein the inflatable cushion maintains an internal pressure in a range of greater than 10 KPa for at least 6 seconds after the inflatable cushion is inflated.

11. The inflatable cushion as in claim 10, wherein the ribbon strip of the third portion of material is located on a needle side of the seam.

12. The inflatable cushion as in claim 1, wherein the ribbon strip of the third portion of material is located on a needle side of the seam.

13. The inflatable cushion as in claim 1, wherein the ribbon strip of the third portion of material is a coated fabric.

14. The inflatable cushion as in claim 1, wherein a width of the ribbon strip of the third portion of material is no greater than ½ of an inch, wherein the width is defined as a distance extending across a surface of the first portion of material or a surface of the second portion of material.

15. The inflatable cushion as in claim 14, wherein the ribbon strip of the third portion of material is located on a needle side of the seam.

16. The inflatable cushion as in claim 15, wherein the inflatable cushion maintains an internal pressure in a range of greater than 10 KPa for at least 6 seconds after the inflatable cushion is inflated.

17. The inflatable cushion as in claim 16, wherein a width of the ribbon strip of the third portion of material is no greater than ⅜ of an inch, wherein the width is defined as a distance extending across a surface of the first portion of material or a surface of the second portion of material.

18. The inflatable cushion as in claim 1, wherein a width of the ribbon strip of the third portion of material is no greater than ⅜ of an inch, wherein the width is defined as a distance extending across a surface of the first portion of material or a surface of the second portion of material.

* * * * *